US012162123B2

(12) United States Patent
Gruenhagen

(10) Patent No.: US 12,162,123 B2
(45) Date of Patent: Dec. 10, 2024

(54) PNEUMATIC MICROFASTENER DRIVING TOOL

(71) Applicant: Kyocera Senco Industrial Tools, Inc., Cincinnati, OH (US)

(72) Inventor: Isabel R. Gruenhagen, Fayetteville, OH (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 1 day.

(21) Appl. No.: 18/206,151

(22) Filed: Jun. 6, 2023

(65) Prior Publication Data

US 2023/0311284 A1 Oct. 5, 2023

Related U.S. Application Data

(63) Continuation of application No. 17/229,073, filed on Apr. 13, 2021, now Pat. No. 11,712,790.

(60) Provisional application No. 63/009,567, filed on Apr. 14, 2020.

(51) Int. Cl.
*B25C 1/04* (2006.01)

(52) U.S. Cl.
CPC .................................... *B25C 1/042* (2013.01)

(58) Field of Classification Search
CPC ......... B25C 1/042; B25C 1/041; B25C 1/047; B25C 1/04; B25C 1/043
See application file for complete search history.

(56) References Cited

U.S. PATENT DOCUMENTS

| | | | | |
|---|---|---|---|---|
| 4,747,338 A * | 5/1988 | Crutcher | B25C 1/042 91/461 |
| 4,986,164 A | 1/1991 | Crutcher | |

OTHER PUBLICATIONS

International Search Report, PCT/US2021/027038. 10 pages (Jul. 16, 2021).

* cited by examiner

*Primary Examiner* — Eronica Martin
(74) *Attorney, Agent, or Firm* — Frederick H. Gribbell; Russell F. Gribbell; William E. Crouse

(57) ABSTRACT

A pneumatic fastener driving tool that forces pressurized gas from a gas supply source into a chamber above a piston enclosed in a working cylinder. During an operational cycle, the pressurized gas is released, forcing the piston to fire. The firing valve seals the pressurized gas utilizing two rolling diaphragm seals, thereby providing less breakdown of hardware and removing the need for lubricant within the firing valve. These diaphragm seals exhibit a smaller diameter than prior diaphragms used in similar pneumatic fastener driving tools.

11 Claims, 23 Drawing Sheets

PNEUMATIC MICROFASTENER DRIVING TOOL

CROSS-REFERENCE TO RELATED APPLICATIONS

The present application is a continuation of application Ser. No. 17/229,073, titled "PNEUMATIC MICROFASTENER DRIVING TOOL," filed on Apr. 13, 2021; and claims priority to provisional patent application Ser. No. 63/009,567, titled "PNEUMATIC MICROFASTENER DRIVING TOOL," filed on Apr. 14, 2020.

TECHNICAL FIELD

The technology disclosed herein relates generally to pneumatic microfastener driving tools and is particularly directed to micropinners of the type which fire small pins into a substrate material. Embodiments are specifically disclosed as fastener driving tools having a pair of "rolling" diaphragms that seal pressurized gas around a firing valve, thus providing a lubricant-free seal around a pressurized cylinder chamber containing a piston and driver that, when actuated, drives a small pin into a substrate.

The microfastener tool includes a gas supply port that provides pressurized gas, and a trigger that actuates a remote valve stem that controls the amount of gas used for each "drive." When the trigger is pulled, pressurized gas floods an inner chamber of the tool, and the pair of rolling diaphragms seals this pressurized gas temporarily within the firing valve chamber. As the trigger is fully depressed, the firing valve actuates, and the pressurized gas rushes into the cylinder upper chamber, and forces the piston and driver downwards. The moving driver "drives" a fastener into a substrate material.

After driving a fastener, pressurized gas returns into the cylinder lower chamber and forces the piston and driver upwards. That gas then exits the tool through a second gas flow passageway and out of the rear of the handle.

The "sealing" effect provided by the rolling diaphragms is due to their shape. Each diaphragm has an outer and inner bead, and between those beads is a convolute, or rolled portion. This convolute "rolls" as the firing valve actuates and resets during a drive stroke, and this "rolling" is what allows the firing valve to seal the pressurized gas without using a lubricant (such as used with a typical O-ring seal).

STATEMENT REGARDING FEDERALLY SPONSORED RESEARCH OR DEVELOPMENT

None.

BACKGROUND

Pneumatic fastener tools for driving nails or staples are common. Typically, such tools comprise a housing with a cylinder containing a piston. This piston includes a driver blade, which is used to sequentially drive staples or nails into a substrate. One of the most important features of such tools is that the firing valve should be very quick so as to impart maximum driving power to the driver blade.

A common problem with these types of tools is that their seals fail around the piston and cylinder, usually due to the sliding friction between the moving valve and the O-ring seal. Once a seal fails, then the pressurized gas used to drive the piston is partially lost, and the tool cannot sufficiently drive a fastener to penetrate a substrate. Most pneumatic tools use O-rings with lubricant to seal the pressurized gas in the cylinder chamber. However, that lubricant may leak out onto a work surface. An alternative to using O-rings is diaphragm seals. However, although diaphragm seals do not require lubricant (thus unable to leak lubricant onto a work surface), they are subjected to stretching during the piston operation.

Another problem with diaphragm seals is their fragility. Since the diaphragm "rolls" during each drive stroke, it must be able to withstand the pressures without breaking. Normally this means unusually large diaphragm seals, much larger than an O-ring for example.

SUMMARY

Accordingly, it is an advantage to provide a fastener driving tool having a firing valve that uses a diaphragm seal that does not require lubricant, in which the diaphragm seal has a diameter significantly smaller than that of the tool.

It is another advantage to provide a fastener driving tool having a firing valve that uses a diaphragm seal that does not require lubricant, in which the upper diaphragm seal has a minimal width between an outer bead and a convolute, and between a convolute and an inner bead, and in which the lower diaphragm seal has a minimal width between an outer bead and a convolute, and between a convolute and an inner bead.

It is yet another advantage to provide a micro-sized fastener driving tool having a firing valve with diaphragm seals, a main valve, and an exhaust vent that allows pressurized gas to vent to atmosphere out of the rear handle portion of the tool.

It is still another advantage to provide a micro-sized fastener driving tool having a firing valve with diaphragm seals, in which the diaphragm seals exhibit a small overall size.

It is a further advantage to provide a micro-sized fastener driving tool having a firing valve with diaphragm seals, and to provide a smaller valve size, the ratio of the top seal's convolute diameter compared to the top seal's inner diameter is maximized.

It is a yet further advantage to provide a micro-sized fastener driving tool having a firing valve with diaphragm seals, and to provide a smaller valve size, the ratio of the bottom seal's convolute diameter compared to the bottom seal's inner diameter is minimized.

It is a still further advantage to provide a micro-sized fastener driving tool having a firing valve with diaphragm seals, and to provide a hollow stem having a cylindrical portion, a tapered portion and a cylindrical wall, and the cylindrical wall exhibiting a uniform thickness at the cylindrical portion and through the tapered portion.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a firing valve subassembly for a pneumatic micro-fastener driving tool is provided, which comprises: a first annular flange, a first annular diaphragm, a second annular diaphragm, a second annular flange exhibiting a hollow stem, and a retainer portion positioned between the first annular flange and the second annular flange; the hollow stem having a longitudinal axis, the first and second annular flanges being spaced-apart along the longitudinal axis, the retainer portion holding the first annular diaphragm against the first annular flange, and the retainer portion holding the second annular diaphragm against the second annular flange; wherein: the first annular flange exhibits an outer diameter smaller than about 26 mm, and the second annular flange exhibits an outer diameter smaller than about 34 mm.

In accordance with another aspect, a firing valve subassembly for a pneumatic micro-fastener driving tool is provided, which comprises: a first annular flange, a first annular diaphragm, a second annular diaphragm, a second annular flange exhibiting a hollow stem, and a retainer portion positioned between the first annular flange and the second annular flange; the hollow stem having a longitudinal axis, the first and second annular flanges being spaced-apart along the longitudinal axis, the retainer portion holding the first annular diaphragm against the first annular flange, and the retainer portion holding the second annular diaphragm against the second annular flange; wherein: the first annular diaphragm exhibits an outer diameter, and an inner diameter; the second annular diaphragm exhibits an outer diameter, and an inner diameter; the first annular diaphragm comprises a first inner bead proximal to the first annular diaphragm inner diameter, a first outer bead proximal to said first annular diaphragm outer diameter, and a first convolute between the first annular diaphragm inner diameter and the first annular diaphragm outer diameter; the second annular diaphragm comprises a second inner bead proximal to the second annular diaphragm inner diameter, a second outer bead proximal to the second annular diaphragm outer diameter, and a second convolute between the second annular diaphragm inner diameter and the second annular diaphragm outer diameter; and a ratio of the first annular diaphragm first convolute diameter over the first annular diaphragm inner bead diameter is larger than 2.0, and a ratio of the second annular diaphragm second convolute diameter over the second annular diaphragm inner bead diameter is smaller than 2.4.

In accordance with yet another aspect, a firing valve subassembly for a pneumatic micro-fastener driving tool is provided, which comprises: a first annular flange, a first annular diaphragm, a second annular diaphragm, a second annular flange exhibiting a hollow stem, and a retainer portion positioned between the first annular flange and the second annular flange; the hollow stem having a longitudinal axis, the first and second annular flanges being spaced-apart along the longitudinal axis, the retainer portion holding the first annular diaphragm against the first annular flange, and the retainer portion holding the second annular diaphragm against the second annular flange; wherein: the first annular diaphragm exhibits an outer diameter smaller than about 28 mm, and an inner diameter smaller than about 8 mm; the second annular diaphragm exhibits an outer diameter smaller than about 33 mm, and an inner diameter smaller than about 10.5 mm; the first annular diaphragm comprises a first inner bead proximal to the first annular diaphragm inner diameter, a first outer bead proximal to the first annular diaphragm outer diameter, and a first convolute between the first annular diaphragm inner diameter and the first annular diaphragm outer diameter; and the second annular diaphragm comprises a second inner bead proximal to the second annular diaphragm inner diameter, a second outer bead proximal to the second annular diaphragm outer diameter, and a second convolute between the second annular diaphragm inner diameter and the second annular diaphragm outer diameter.

In accordance with a still further aspect, a firing valve subassembly for a pneumatic micro-fastener driving tool is provided, which comprises: a first annular flange, a first annular diaphragm, a second annular diaphragm, a second annular flange including a hollow stem, and a retainer portion positioned between the first annular flange and the second annular flange; the hollow stem exhibiting a longitudinal axis, the first and second annular flanges being spaced-apart along and perpendicular to the longitudinal axis, the retainer portion holding the first annular diaphragm against the first annular flange, and the retainer portion holding the second annular diaphragm against the second annular flange; wherein: the hollow stem, proximal to the first annular flange, includes a tapered portion; the hollow stem exhibits a constant outer diameter throughout its length along the longitudinal axis, from the second annular flange to the tapered portion; the hollow stem includes a nominally cylindrical wall that extends from the second annular flange to the first annular flange, and includes the tapered portion; and the nominally cylindrical wall of the hollow stem exhibits a uniform thickness from the first annular flange through and including the tapered portion.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
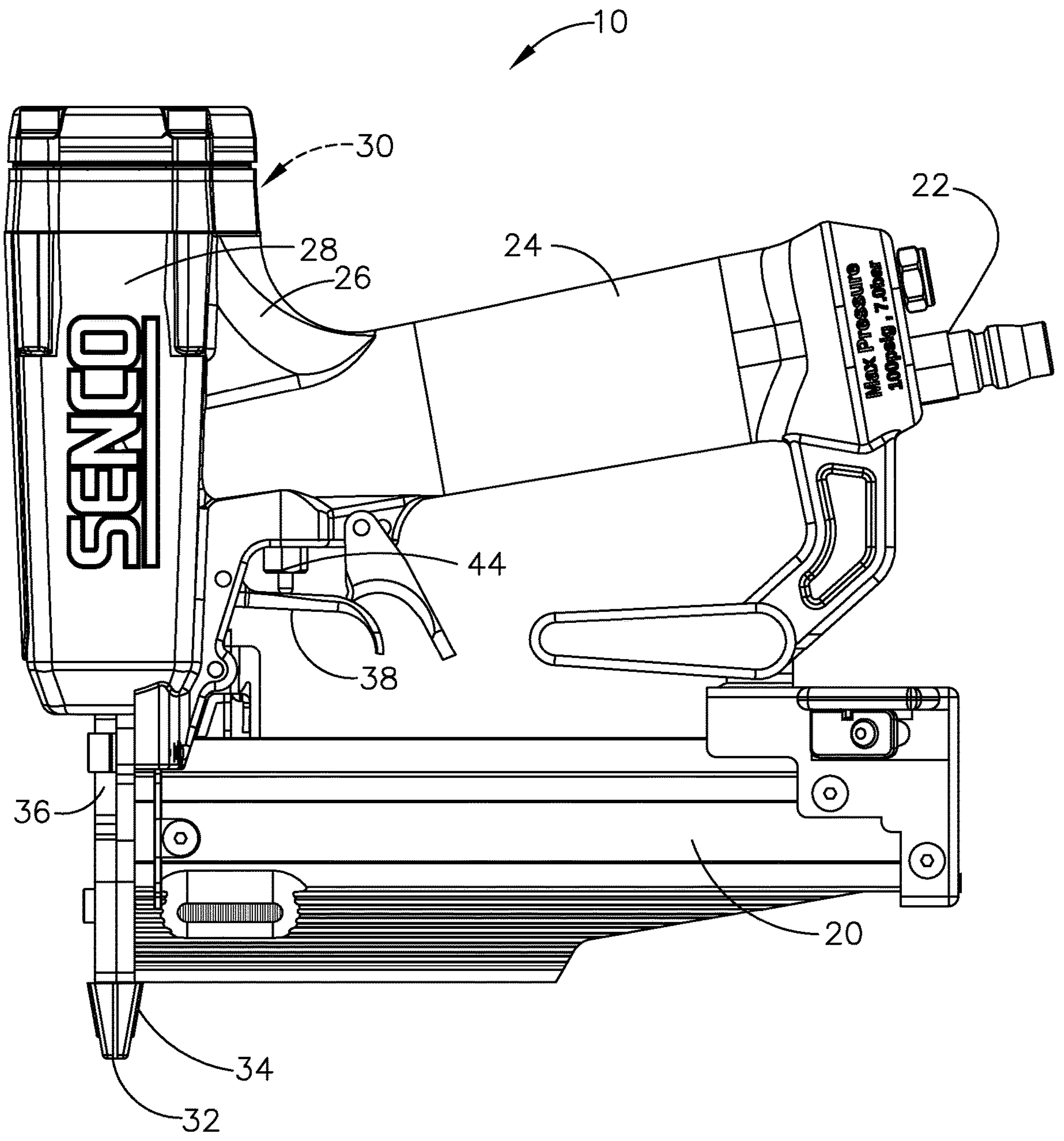
FIG. 1 is a side view of a pneumatic fastener driving tool, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

Referring now to FIG. 1, a pneumatic fastener driving tool is generally designated by the reference numeral 10. The tool 10 has a working cylinder outer housing 28 having a main valve subassembly (S/A) 30 and a guide body 36, with a fastener exit 32 at an opposite end from the main valve. A workpiece contact element 34 is located at the end of the guide body 36 where the tool 10 would first contact a substrate when driving a fastener. A fastener magazine 20 is attached below the guide body 36, which feeds fasteners to be driven by the tool 10. A handle 24 having an outer housing portion 26 is positioned along the working cylinder housing 28. A gas supply port 22 is located at an opposite end of the handle 24 from the working cylinder housing 28. The handle 24 includes a trigger 38 which, when depressed by a human user, engages a remote valve stem 44.

Figure 2:
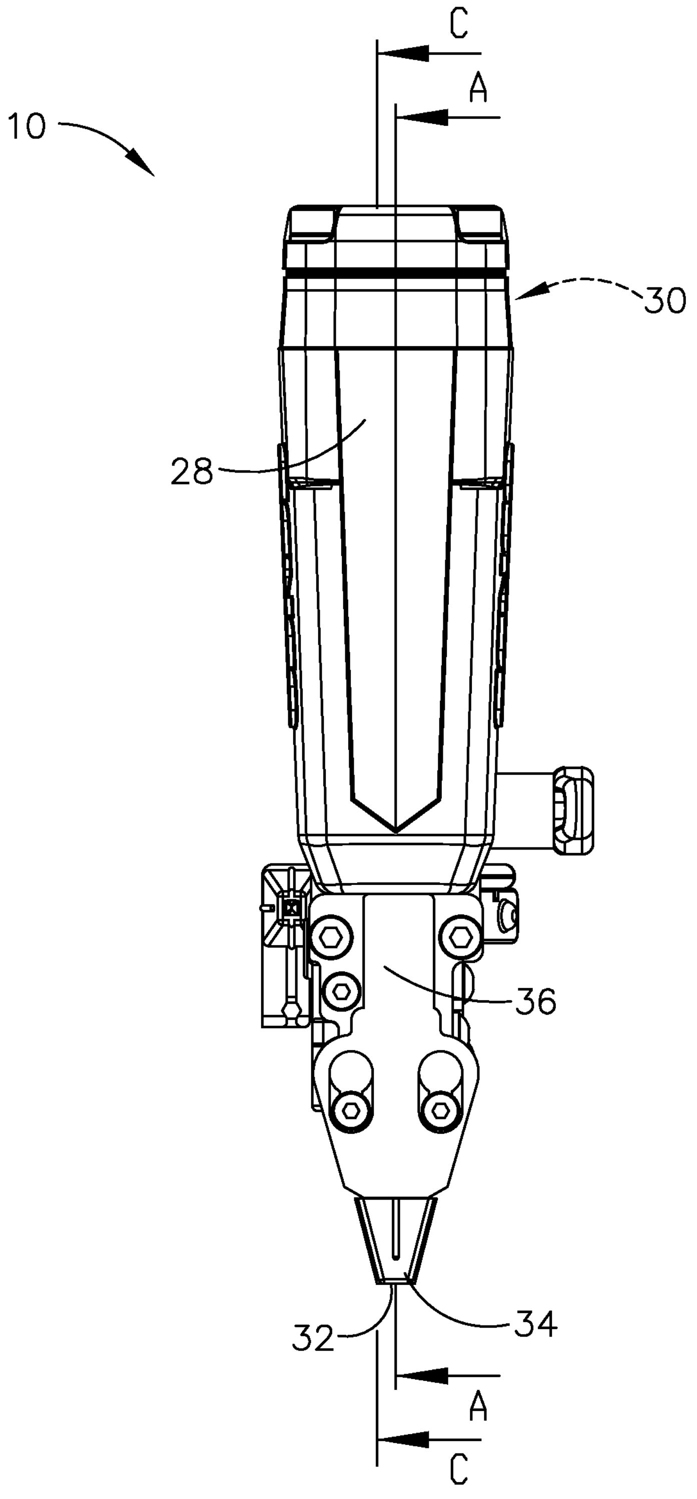
FIG. 2 is a top view of the fastener driving tool of FIG. 1.

Referring now to FIG. 2, the tool 10 is depicted in a side view opposite the handle. The main valve S/A 30 is at one (proximal) end of the tool, and the contact element 34 is at the opposite, distal end. Proximal to the main valve S/A 30 is the cylinder housing 28. Between the housing 28 and the contact element 34 is the guide body 36.

Figure 3A:
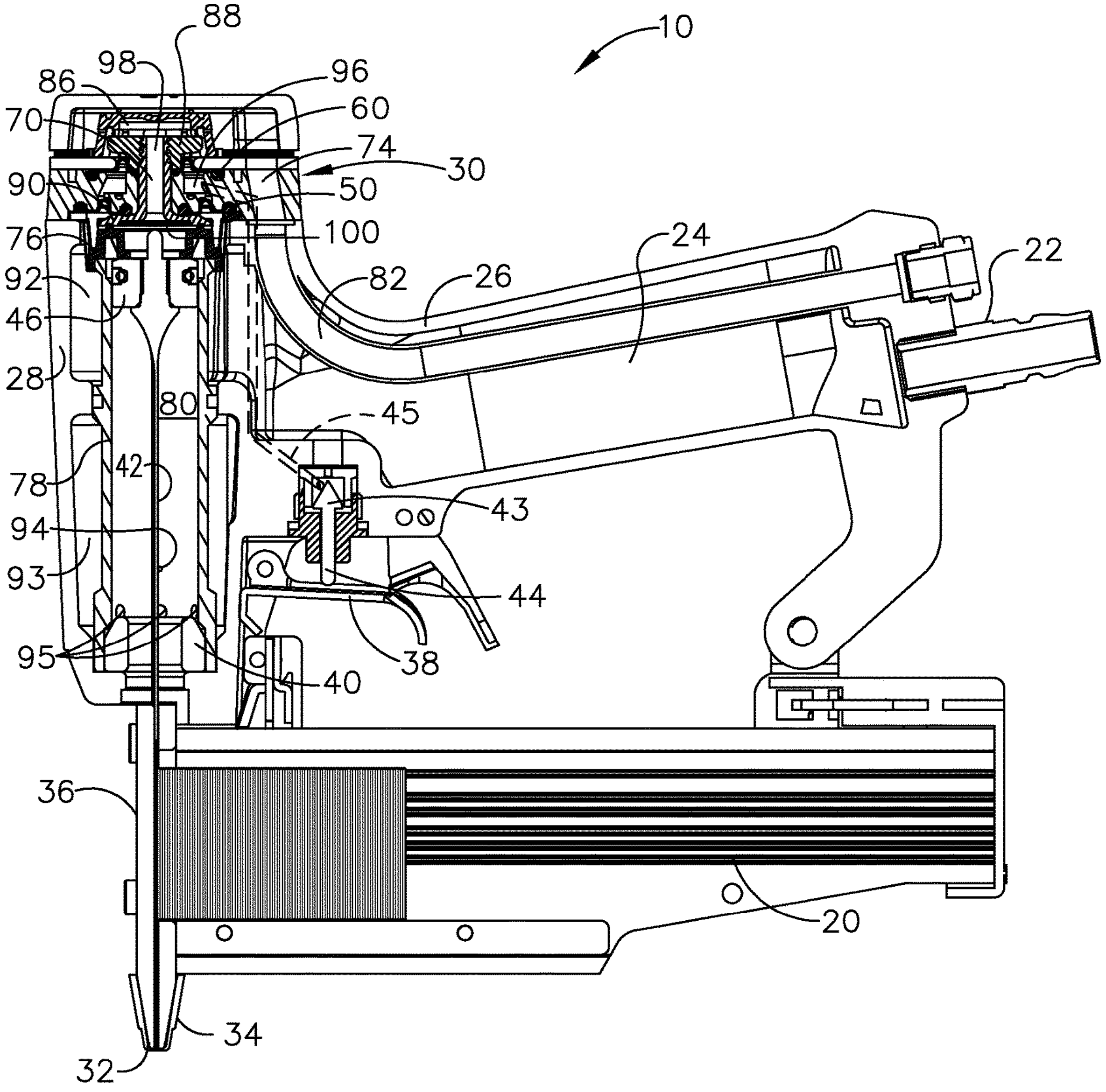
FIG. 3A is a side cutaway view along the line A-A of FIG. 2 of the fastener driving tool of FIG. 1 in an idle position.

Referring now to FIG. 3A, many of the inner mechanisms of the tool 10 are depicted. An external gas supply may be attached to the gas supply port 22, and then pressurized gas flows through a first gas flow passageway 45 as it fills a firing valve air chamber 96 (the space between a lower rolling diaphragm seal 50 and an upper rolling diaphragm seal 60). The pressurized gas also fills the handle 24 and an upper cylinder chamber 92. It should be noted that the upper cylinder chamber 92 will sometimes be referred to herein as the "first cylinder chamber." A main piston 46 is located under the lower diaphragm 50 (in this view). Attached to the piston 46 is a driver blade 42. A working cylinder 80, having an outer cylinder wall 78, encloses the piston 46 and a portion of the driver blade 42.

When the trigger 38 is depressed, unsealing the valve stem 44 of a remote trigger valve 43, the firing valve air chamber 96 empties. This allows the diaphragm seals 50 and 60 to roll, lifting a lower annular flange (or flow diverter) 90 off of a sleeve retainer 76, as depicted in FIG. 9. This "lift" is the firing stroke for a firing valve subassembly (S/A) 110 (see FIG. 8), which then allows the pressurized gas to flood the working cylinder 80 above the main piston 46. The pressurized gas forces the piston 46 and driver blade 42 down (in FIG. 3A) which subsequently drives a fastener into a substrate. The piston 46 contacts a piston stop 40 during a drive stroke, which stops the piston's movement, where it finally stops moving at a "driven position" (or fired position).

Once the piston 46 has passed a set of gas check valve holes 94 in the outer cylinder wall 78, gas can escape into a lower cylinder chamber 93. When the trigger 38 is released and the firing valve subassembly 110 resets, the working cylinder 30 is resealed at the top. Then gas rushes back into the working cylinder 80 via a plurality of return air holes 95. This "rush" of gas forces the piston 46 and driver blade 42 back upwards (in this view) to a "ready position" (or idle position). The gas then continues flowing through the main valve S/A 30 and though an exhaust valve portion (or upper annular flange) 88. Then the gas flows through an exhaust port 84 (see FIG. 5) and through a second gas flow passageway 82, and out of the handle 24 at the rear of the tool.

Figure 3B:
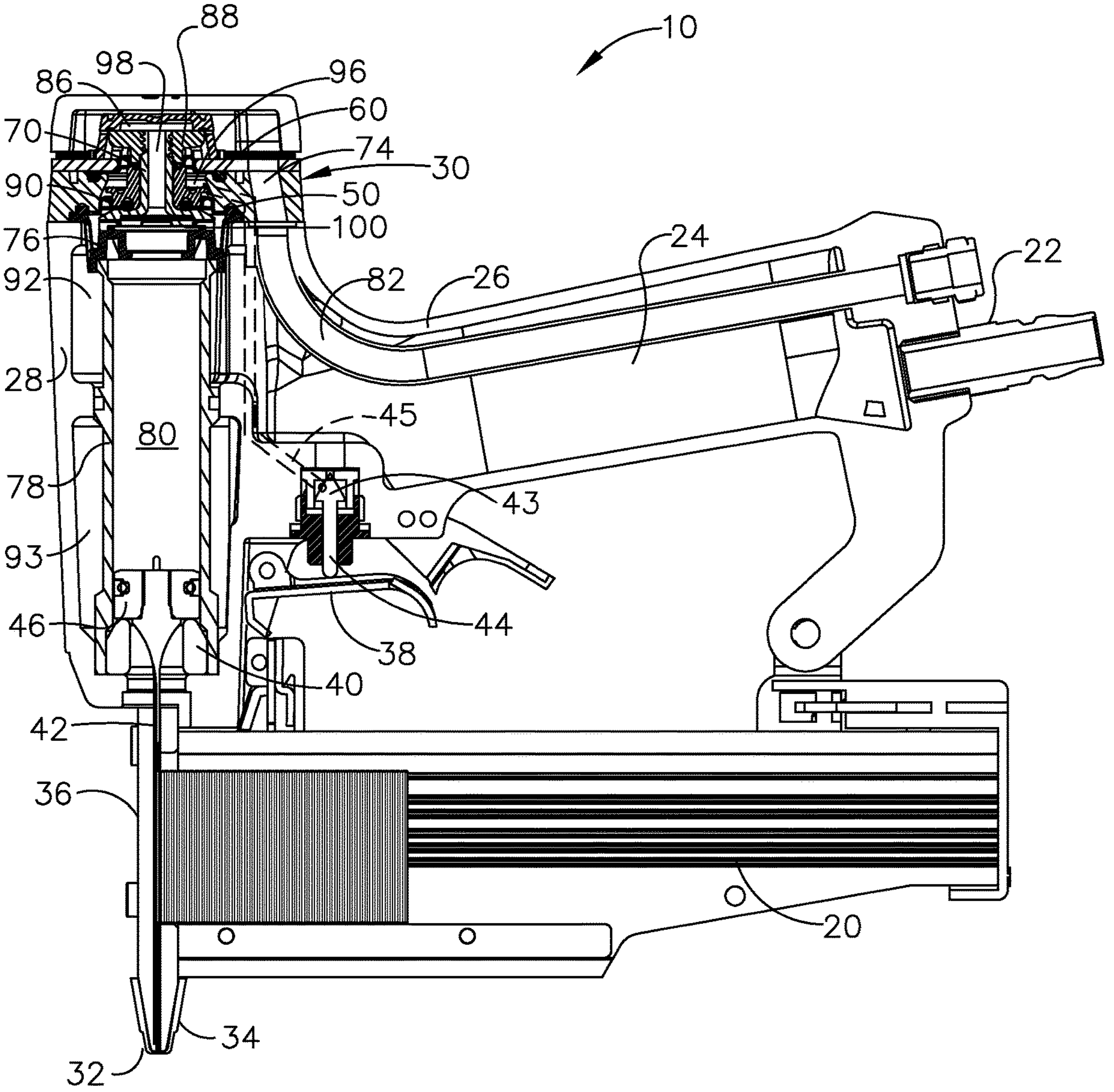
FIG. 3B is a side cutaway view along the line A-A of FIG. 2 of the fastener driving tool of FIG. 1 in a fired position.

Referring now to FIG. 3B, a fired, or driven position is illustrated. The trigger 38 is fully "pulled," or actuated, and the stem 44 is fully depressed. The piston 46 and driver blade 42 are at their driven, or fired position. Gas that was trapped below the piston has been forced into the lower cylinder chamber 93, through a plurality of return air holes 95 in the outer cylinder wall 78 depicted in FIG. 3A. Note that the piston 46 has stopped at a position near those return air holes 95. In this state, the firing valve S/A 110 (see FIG. 8) has "rolled" up and off the sleeve retainer 76, from the pressure difference between the firing valve air chamber 96 and the upper cylinder chamber 92, and the diaphragm convolutes 56 and 66 (see FIGS. 10 and 11) "rolling." This "rolling" up separates the flow diverter 90 from the sleeve retainer 76, which allows the pressurized gas to drive the piston 46 into a driving stroke. It should be noted that the convolute 66 will sometimes be referred to herein as the "first convolute" or the "middle convolute," and that the convolute 56 will sometimes be referred to herein as the "second convolute" or the "middle convolute."

Note that the exhaust valve portion 88 "seals" with an exhaust seal 86. Once the trigger 38 is released and the lower annular flange 90 has reseated with the sleeve retainer 76, the pressurized gas stored in the lower cylinder chamber 93 will exit through the return air holes 95 and force the piston 46 back to a ready position. The gas above the piston 46 is forced through a hollow stem portion 98, through the exhaust valve portion 88, through a gas flow port 74, and through a second gas flow passageway 82, thereby exiting the tool to atmosphere at the rear of the handle portion 24. Note that a center post 70 connects the flow diverter portion 90 to the exhaust valve portion 88. The hollow stem portion 98 exhibits a longitudinal axis and is perpendicular to the bottom flange 90 and the upper flange 88, and is enclosed by the center post 70 which is part of the same movable structure as the bottom flange (or flow diverter portion) 90. In this illustrated embodiment, the center post 70 is threaded at the top, for connecting to the exhaust valve portion.

Note also that as long as the trigger 38 is "pulled," the piston 46 will remain in a fired position. Once the trigger 38 is released, the remote valve's stem 44 seals and cuts off the vent to atmosphere to the firing valve air chamber 96. This will "roll" the firing valve S/A 110 (see FIG. 8) back into a sealed position with the sleeve retainer 76, and the gas will flow due to the pressure difference as described in the previous paragraph.

Figure 4:
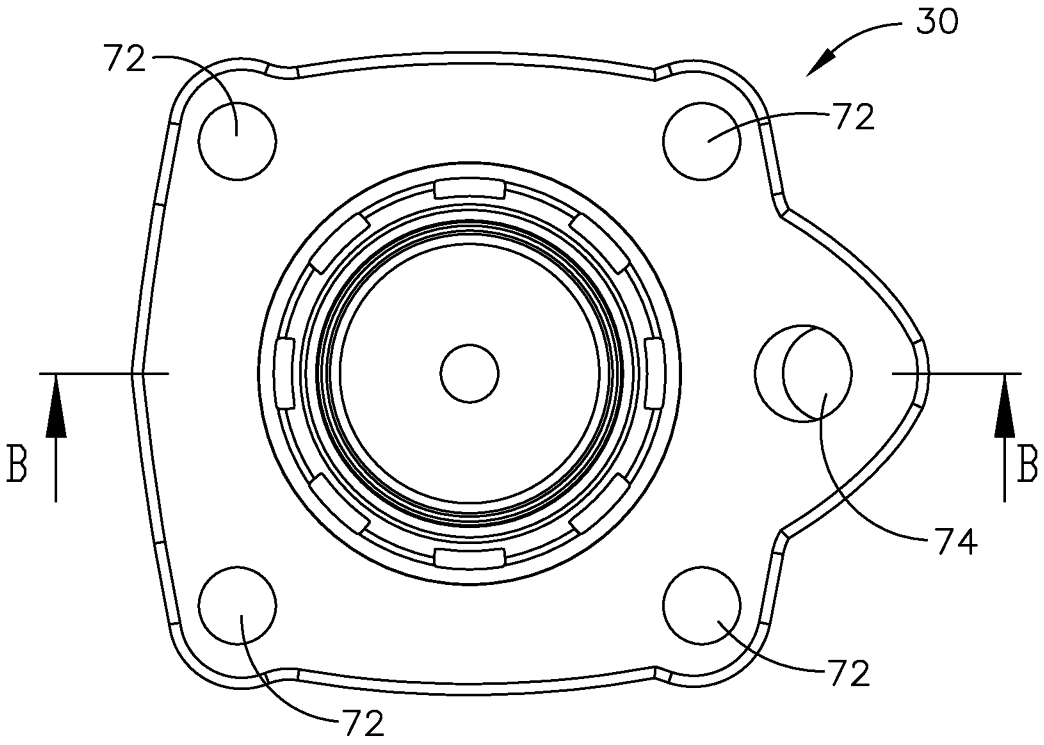
FIG. 4 is a top view of a main valve sub-assembly of the fastener driving tool of FIG. 1.

Referring now to FIG. 4, the main valve S/A 30 is illustrated. Four bolt holes 72 are used to secure the main valve S/A 30 to the tool 10. The gas flow port 74 allows the pressurized gas to exhaust from the exhaust port 84 (see FIG. 5), through the second gas flow passageway 82, and out the rear of the handle portion 24, as depicted in FIGS. 3A and 3B.

Figure 5:
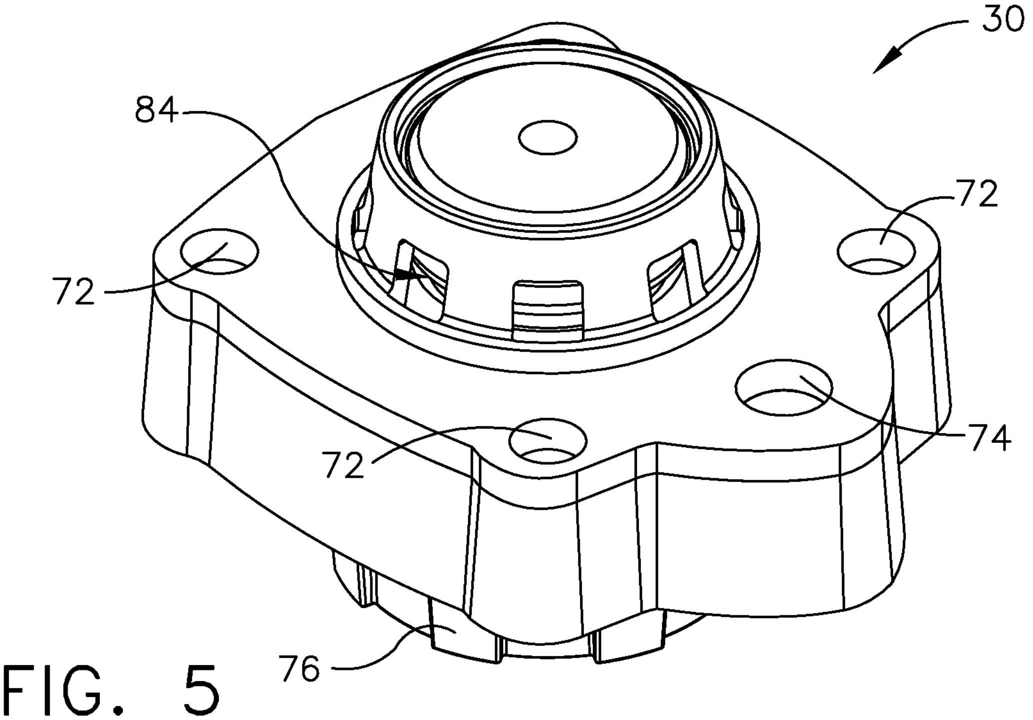
FIG. 5 is a top perspective view of the main valve sub-assembly of FIG. 4.
Figure 6:
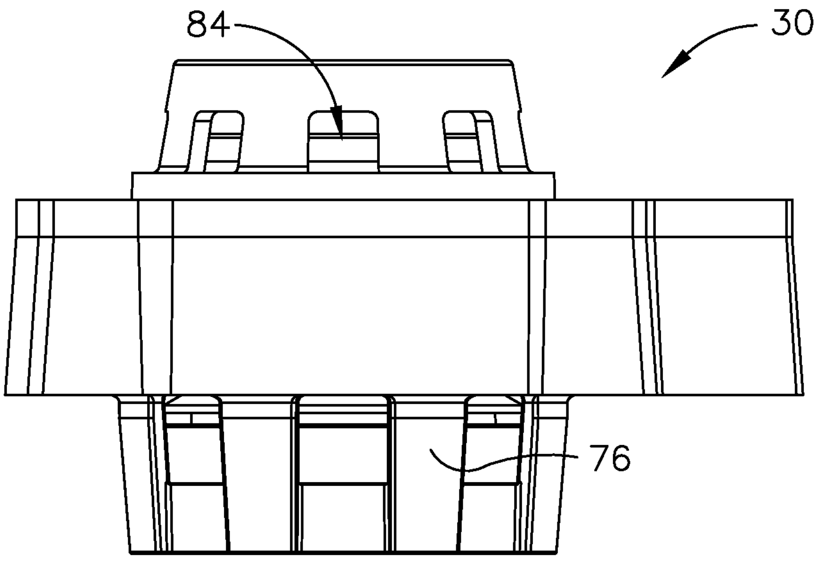
FIG. 6 is a side elevational view of the main valve sub-assembly of FIG. 4.
Figure 7:
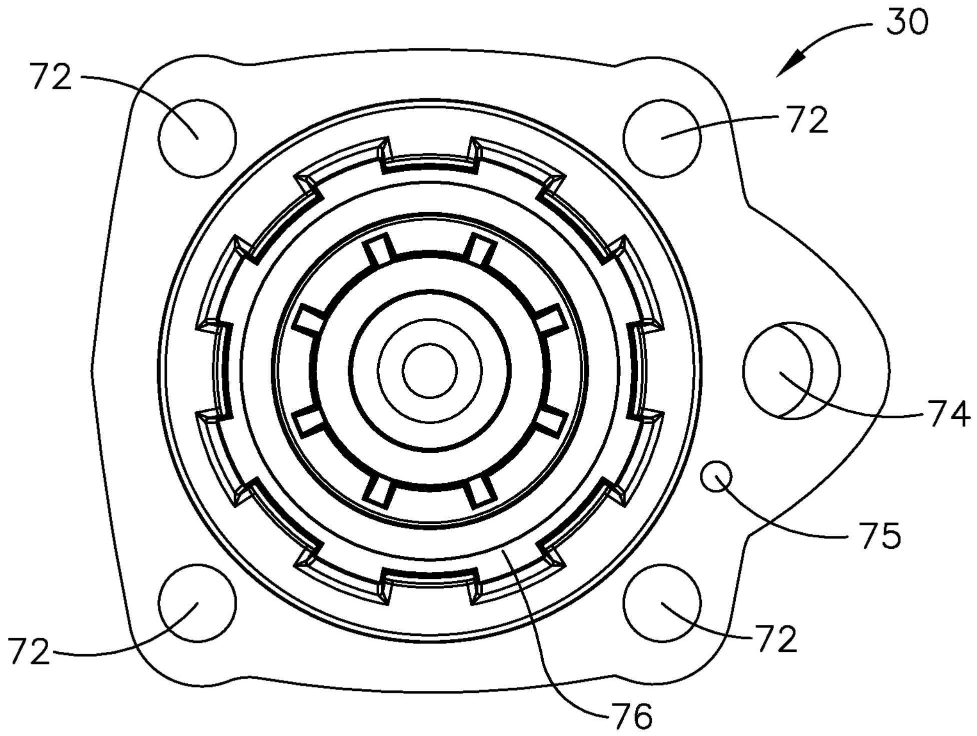
FIG. 7 is a bottom plan view of the main valve sub-assembly of FIG. 4.

FIGS. 5, 6, and 7 illustrate various perspectives of the main valve S/A 30. FIGS. 5 and 6 depict the exhaust port 84 protruding from the upper region of the main valve S/A 30. A sleeve retainer 76 is illustrated below the main valve S/A 30, and this retainer helps locate the main valve S/A 30 over the working cylinder 80. Note that FIG. 7 depicts a firing valve air chamber port 75. This port connects the firing valve air chamber 96 with the first gas flow passageway 45.

Figure 8:
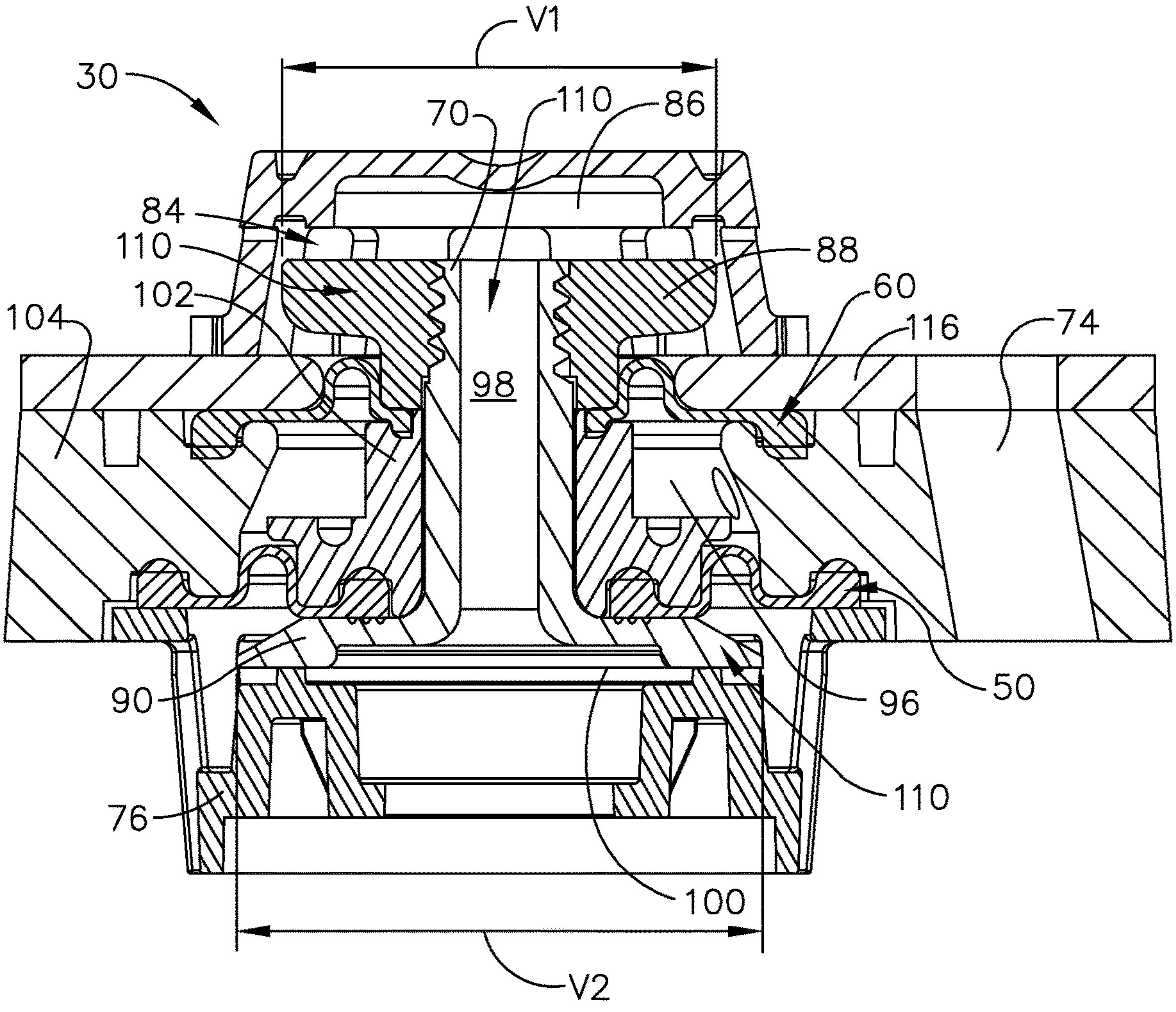
FIG. 8 is a side cutaway view illustrating an idle position along the line B-B of the main valve sub-assembly of FIG. 4.
Figure 9:
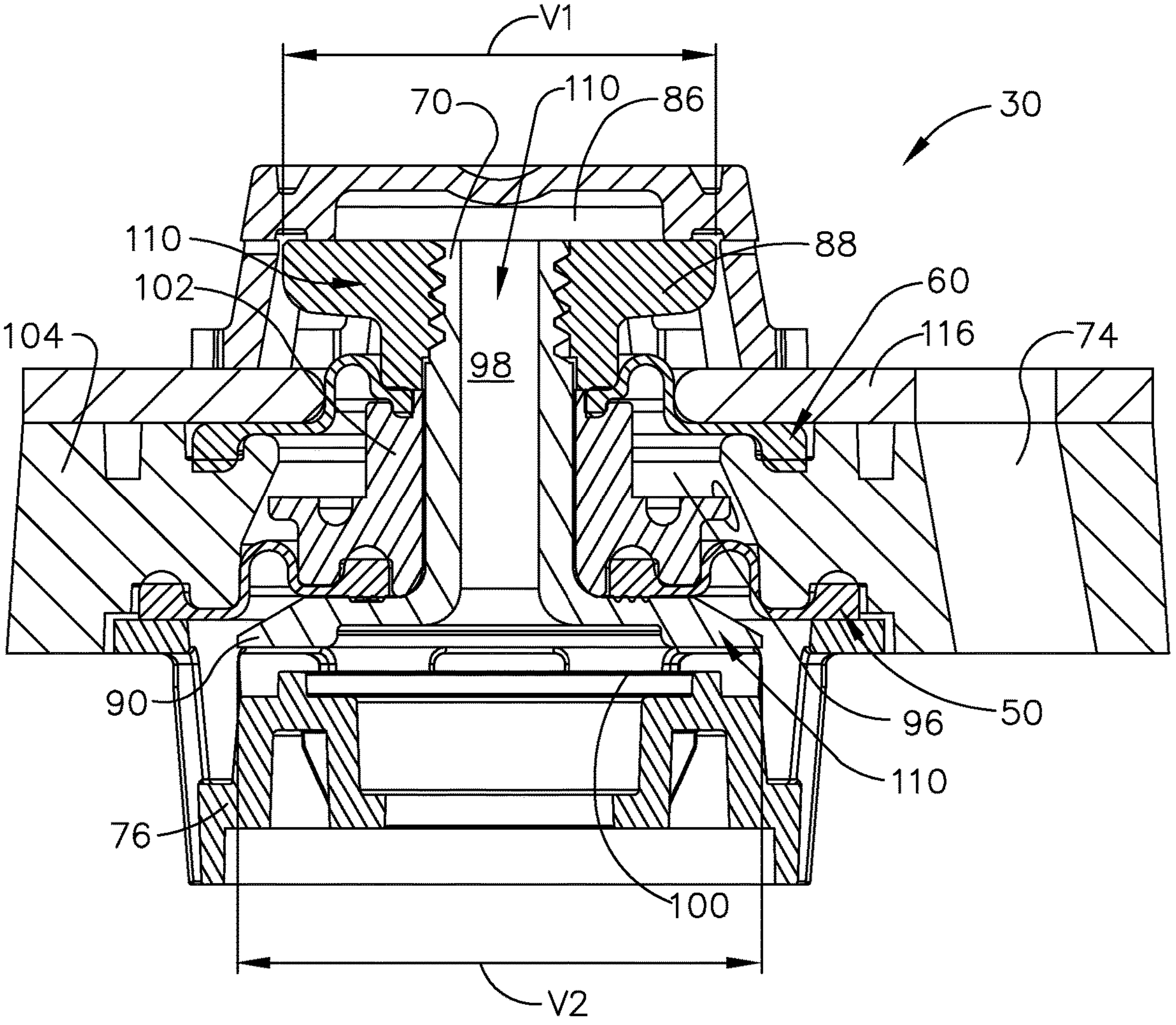
FIG. 9 is a side cutaway view illustrating a fired position of the main valve of FIG. 4.

Referring now to FIG. 8, the main valve S/A 30 is illustrated in a cutaway view along the line A-A of FIG. 4. The lower diaphragm seal 50 is illustrated mounted above a flow diverter portion (or lower annular flange) 90 of the firing valve. Below the flow diverter portion 90 is the sleeve retainer 76. At the distal end of the main valve S/A 30, is the exhaust seal 86, and a reciprocating exhaust valve portion 88. The exhaust valve 88 is sealed by the upper diaphragm 60. The two diaphragms 50 and 60 are retained in place by a retainer portion 102, a valve body side portion 104, and a plate retainer 116. Between the two rolling diaphragm seals is a firing valve S/A 110. The firing valve S/A 110 includes a center post (or stem) 70 with an inner hollow stem portion 98, that is connected to the exhaust valve portion 88 at one (proximal) end, and a valve seat 100 at the opposite, distal end. The center post 70 is threaded at the end near the exhaust valve portion 88. The gas flow port 74 is shown to the right side (in this view) of the firing valve air chamber 96.

In FIG. 8 the main valve S/A 30 is illustrated in a ready position (or idle position), in which the tool is ready to fire (drive) a fastener. In this ready position, the flow diverter portion 90 sits on the valve seat 100, effectively sealing pressurized gas above the working cylinder 80. (Note, the valve seat 100 is the sealing surface on the sleeve retainer 76.) In this view the exhaust valve portion 88 is not touching (or sealing) the exhaust seal 86. In other words, the pressurized gas flowing in from the first gas flow passageway 45 is being held above the working cylinder 80 in the space between the lower diaphragm 50 and the upper diaphragm 60 (the firing valve air chamber 96).

FIG. 8 also illustrates a dimension V1 depicting the diameter of the upper annular flange 88, which is about 19.71 mm. A dimension V2 is depicted depicting the diameter of the lower annular flange 90, which is about 23.88 mm.

Referring now to FIG. 9, the main valve S/A 30 is illustrated in a driven position (or fired position), in which the tool has just fired a fastener. In this driven position, the flow diverter portion 90 is unseated from the valve seat 100 and raised above the sleeve retainer 76, thus unsealing the stored pressurized gas so as to (then) exhaust out and force the piston 46 (see FIGS. 3A and 3B) in a downward (in this view) driving stroke. Note that the exhaust valve portion 88 is now sealingly engaged with the exhaust seal 86, which prevents any gas left in the main valve S/A 30 from escaping out of the exhaust port 84 (see FIG. 8). The lower rolling diaphragm 50 and upper rolling diaphragm 60 have "rolled" to allow the hollow stem portion 98 and firing valve S/A 110 to move upwards (in this view). In other words, the outer beads 57 and 68 (see FIGS. 10 and 11) of these diaphragms are held in place by the valve body side portion 104, while the upper beads are forced to move with the firing valve's movements, thereby causing the convolutes 56 and 66 (see FIGS. 10 and 11) to slightly deform (by rolling, or unrolling) in overall shape, but without any sliding action against the inner or outer diameters of those diaphragms 50 and 60, thus eliminating any need for additional lubricant.

Figure 10:
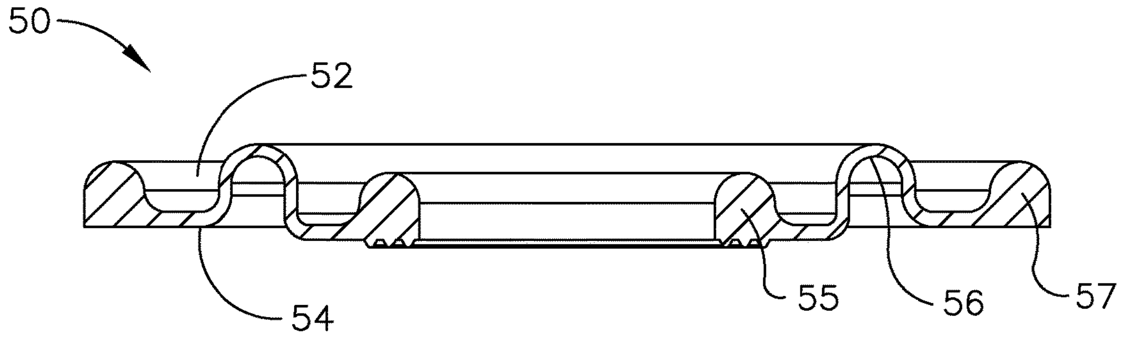
FIG. 10 is a side cutaway view of a lower diaphragm of the fastener driving tool of FIG. 1.

FIGS. 10 through 16 provide a detailed look at the two diaphragms used in the fastener driving tool disclosed herein. FIG. 10 illustrates a side cutaway view of the lower rolling diaphragm seal 50. One side of the diaphragm is a fabric side 52, and the opposite side is a high pressure side 54. The outer diameter portion includes an outer bead 57. The middle diameter portion includes a middle convolute (or roll) 56, and the inner diameter portion includes an inner bead 55. The outer and inner beads 57, 55 help maintain the structural integrity of the lower diaphragm 50, from the wear and tear of the drive stroke of the tool 10. The convolute 56 "rolls" during a drive stroke to maintain a seal for channeling the pressurized gas, and to provide reciprocating movement of the stem 70 and the hollow stem portion 98. The "rolling" of the convolute 56 allows the inner bead 55 to maintain its seal with the upper annular flange 88 and the retainer portion 102 during a drive stroke.

Figure 11:
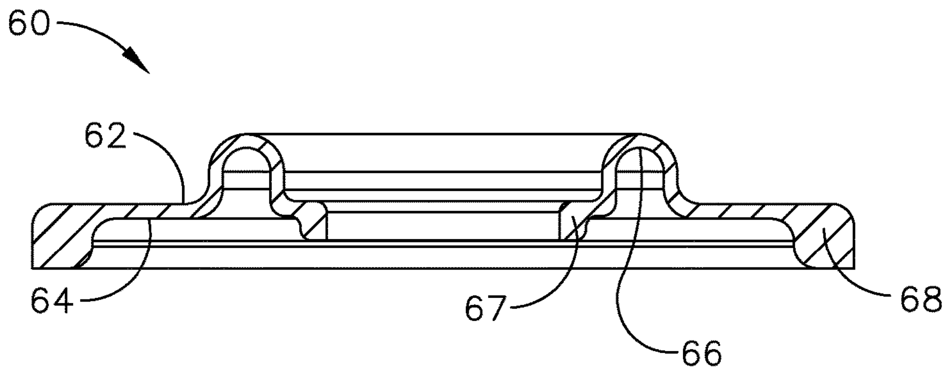
FIG. 11 is a side cutaway view of an upper diaphragm of the fastener driving tool of FIG. 1.

FIG. 11 illustrates a side cutaway view of the upper rolling diaphragm seal 60. Similar to the lower diaphragm 50, the upper diaphragm 60 has a fabric side 62, and an opposite high pressure side 64. The outer diameter portion includes an outer bead 68. The middle diameter portion includes a middle convolute (or roll) 66, and the inner diameter portion includes an inner bead 67. The beads 67 and 68 provide structural integrity to the contact regions of the diaphragm 60. The convolute 66 "rolls" when the tool 10 is undergoing a drive stroke. This "rolling" of the convolute 66 allows the inner bead 67 to maintain its seal with the lower annular flange 90 and the retainer portion 102, thus containing and channeling the pressurized gas during both a drive stroke and a return stroke of the firing valve S/A 110.

Figure 12A:
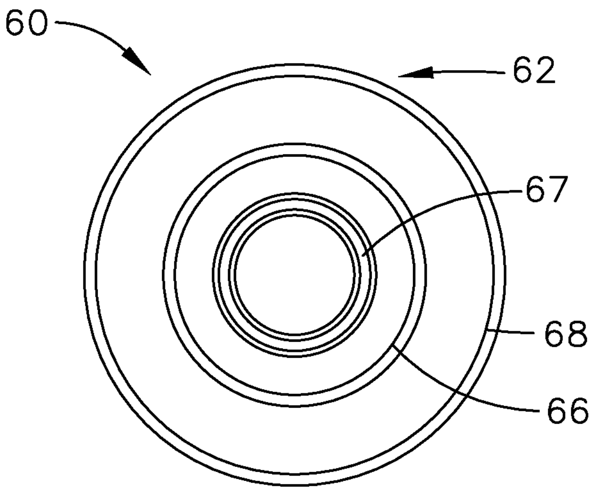
FIG. 12A is a top view of the upper diaphragm of FIG. 11.
Figure 12B:
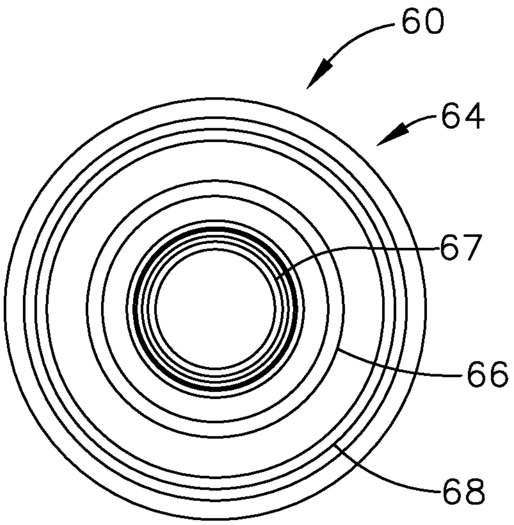
FIG. 12B is a bottom view of the upper diaphragm of FIG. 11.

FIGS. 12A and 12B illustrate a top and bottom view of the upper diaphragm 60. The inner bead 67, rolling convolute 66, and outer bead 68 are depicted in both views. FIG. 12A depicts the fabric side 62, and FIG. 12B depicts the high pressure side 64.

Figure 13A:
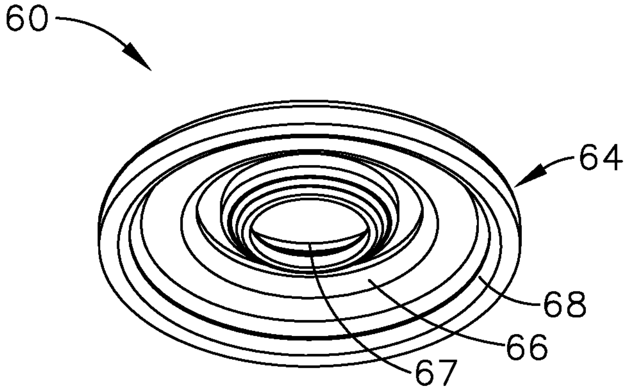
FIG. 13A is a bottom perspective view of the upper diaphragm of FIG. 11.
Figure 13B:
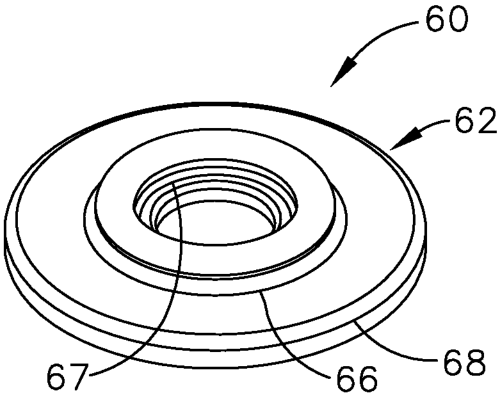
FIG. 13B is a top perspective view of the upper diaphragm of FIG. 11.

FIGS. 13A and 13B illustrate a bottom and top perspective view, respectively, of the upper diaphragm 60. The inner bead 67, rolling convolute 66, and outer bead 68 are depicted in both views. FIG. 13A depicts the high pressure side 64, and FIG. 13B depicts the fabric side 62.

Figure 14A:
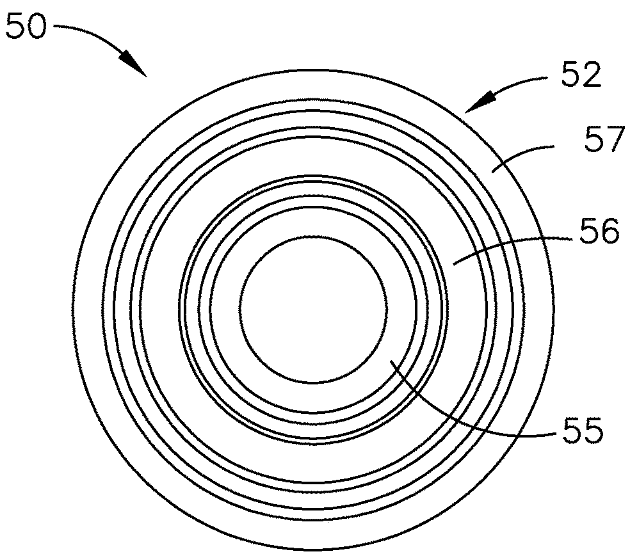
FIG. 14A is a top view of the lower diaphragm of FIG. 10.
Figure 14B:
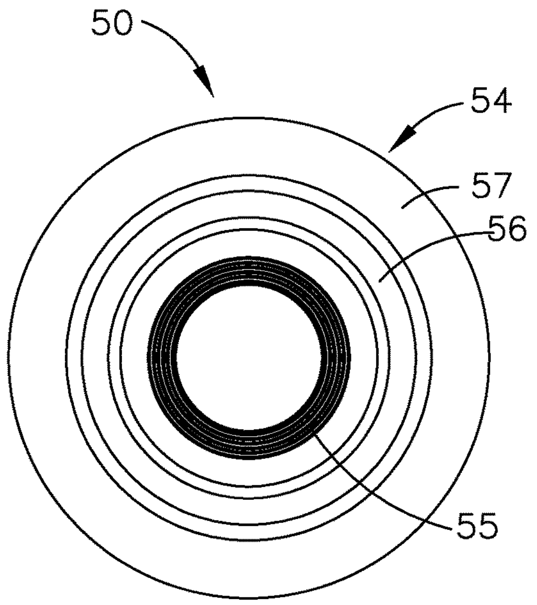
FIG. 14B is a bottom view of the lower diaphragm of FIG. 10.

FIGS. 14A and 14B illustrate a top and bottom view of the lower diaphragm 50. The inner bead 55, rolling convolute 56, and outer bead 57 are depicted in both views. FIG. 14A depicts the fabric side 52, and FIG. 14B depicts the high pressure side 64.

Figure 15A:
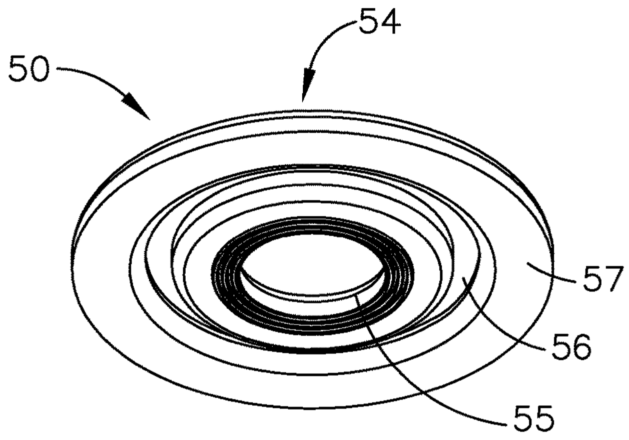
FIG. 15A is a bottom perspective view of the lower diaphragm of FIG. 10.
Figure 15B:
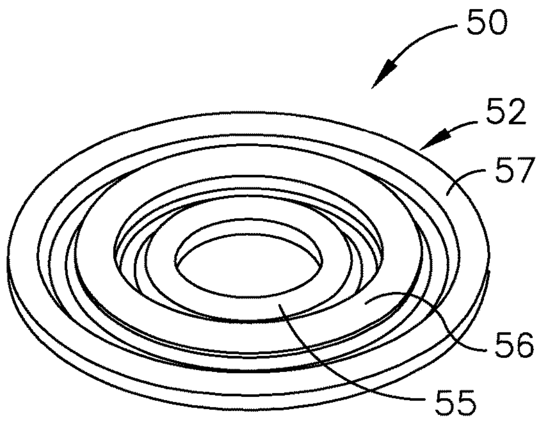
FIG. 15B is a top perspective view of the lower diaphragm of FIG. 10.

FIGS. 15A and 15B illustrate a bottom and top perspective view, respectively, of the lower diaphragm 50. The inner bead 55, rolling convolute 56, and outer bead 57 are depicted in both views. FIG. 15A depicts the high pressure side 54, and FIG. 15B depicts the fabric side 52.

Figure 16:
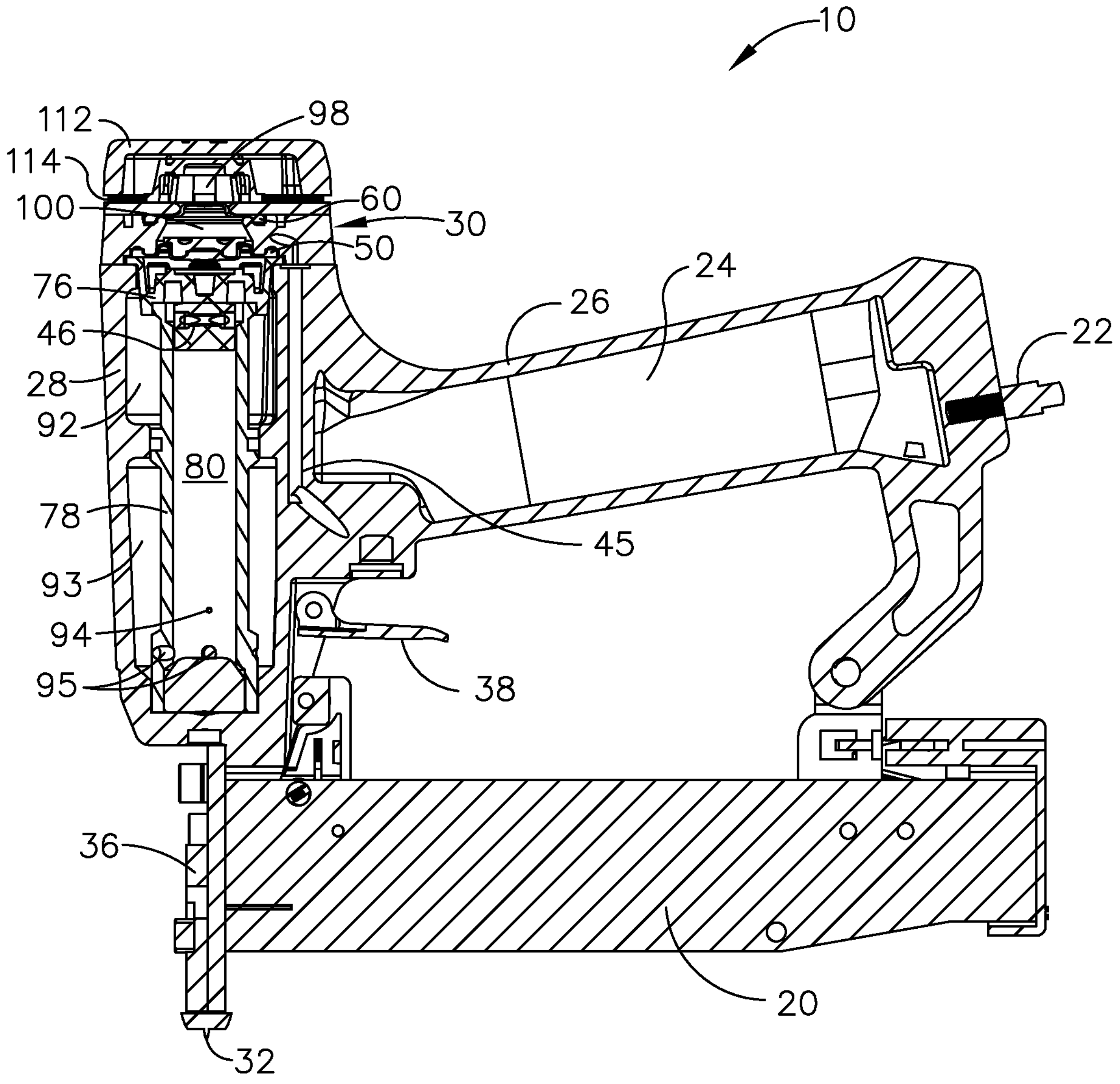
FIG. 16 is a side cutaway view along the line C-C of FIG. 2 of the fastener driving tool of FIG. 1.

Referring now to FIG. 16, this view illustrates a "deeper" cutaway view along the line C-C of FIG. 2. The first gas flow passageway 45 can be clearly seen, providing a gas passageway between the handle 24 and remote trigger valve 43 (not shown in this view), and the firing valve air chamber 96 (see FIGS. 3A and 3B). Note that the tool 10 exhibits an end portion 112, and proximal to that end portion 112 is at least one gasket 114.

Figure 17A:
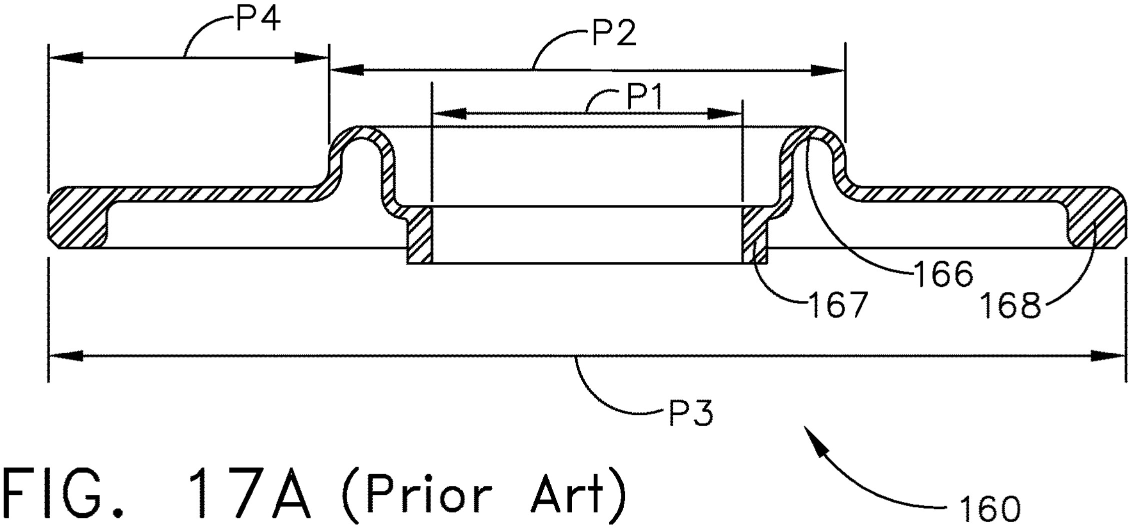
FIG. 17A (Prior Art)
FIG. 17A is a side cutaway view of an upper diaphragm of a pneumatic fastener driving tool, known in the prior art as a Senco Model SLS.

Referring now to FIG. 17A, a prior art upper diaphragm 160 for a pneumatic fastener driving tool is depicted. The diaphragm 160 has an outer bead 168, a convolute 166, and an inner bead 167. This view illustrates the upper diaphragm from a Senco Model SLS pneumatic stapler.

A dimension P1 illustrates the inner diameter of the upper diaphragm 160, at the inner bead 167, which distance is about 11.3 mm. A dimension P2 illustrates the diameter of the outer edge of the convolute 166, which distance is about 18.8 mm. A dimension P3 depicts the upper diaphragm's diameter, which is about 38.9 mm. A dimension P4 depicts the distance between the outer edge of the outer bead 168 and the outer edge of the convolute 166, along the radius of the diaphragm 160.

Figure 17B:
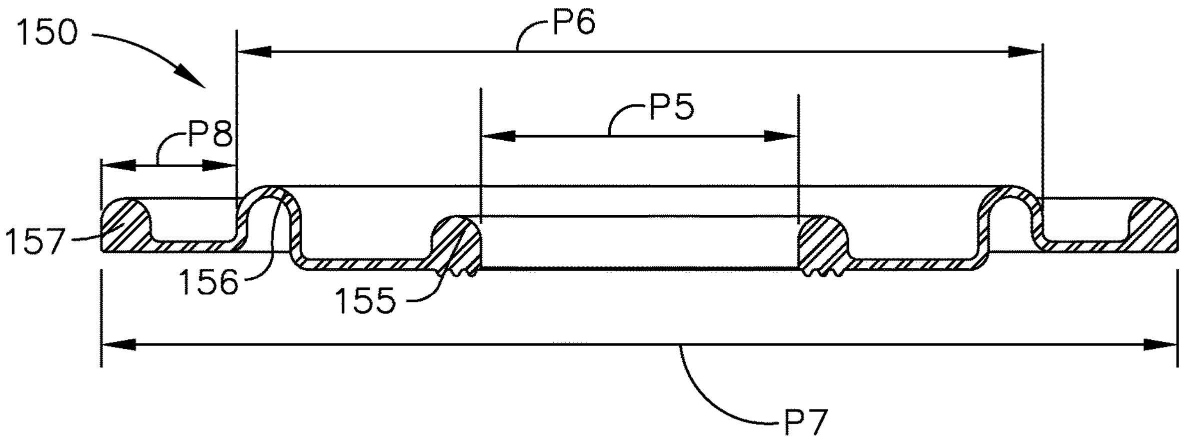
FIG. 17B (Prior Art)
FIG. 17B is a side cutaway view of a lower diaphragm of a pneumatic fastener driving tool, known in the prior art as a Senco Model SLS.

Referring now to FIG. 17B, a prior art lower diaphragm 150 for a pneumatic fastener driving tool is depicted. Diaphragm 150 has an outer bead 157, a convolute 156, and an inner bead 155. This view illustrates the lower diaphragm from a Senco Model SLS pneumatic stapler.

A dimension P5 depicts the inner diameter of the lower diaphragm 150, at the inner bead 155, which is about 13.13 mm. A dimension P6 illustrates the diameter of the outer edge of the convolute 156, which is about 33.27 mm. A dimension P7 illustrates the lower diaphragm's diameter, which is about 44.45 mm. A dimension P8 depicts the distance between the outer edge of the outer bead 157 and the outer edge of the convolute 156, along the radius of diaphragm 150.

Figure 17C:
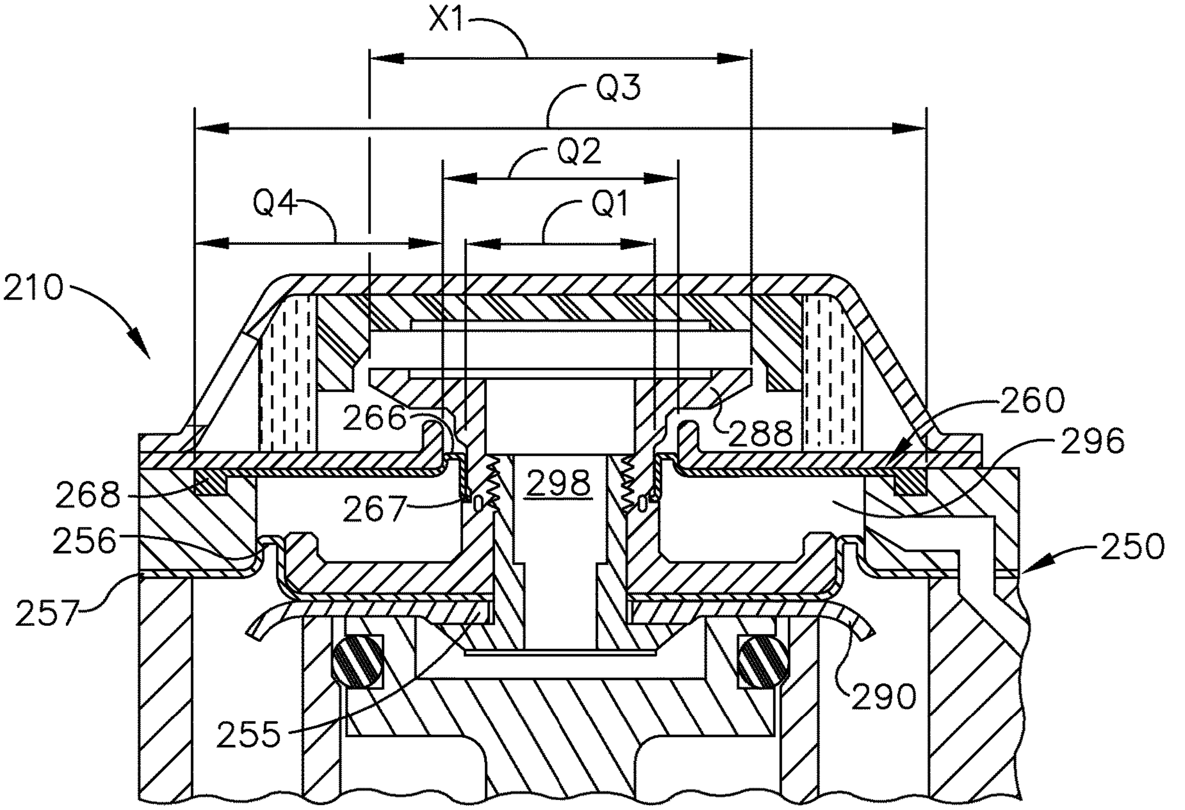
FIG. 17C (Prior Art)
FIG. 17C is a side cutaway view of the firing valve, with diaphragm seals, of a pneumatic fastener driving tool known in the prior art as a Senco Model SKS, showing the valve in its idle position.
Figure 17D:
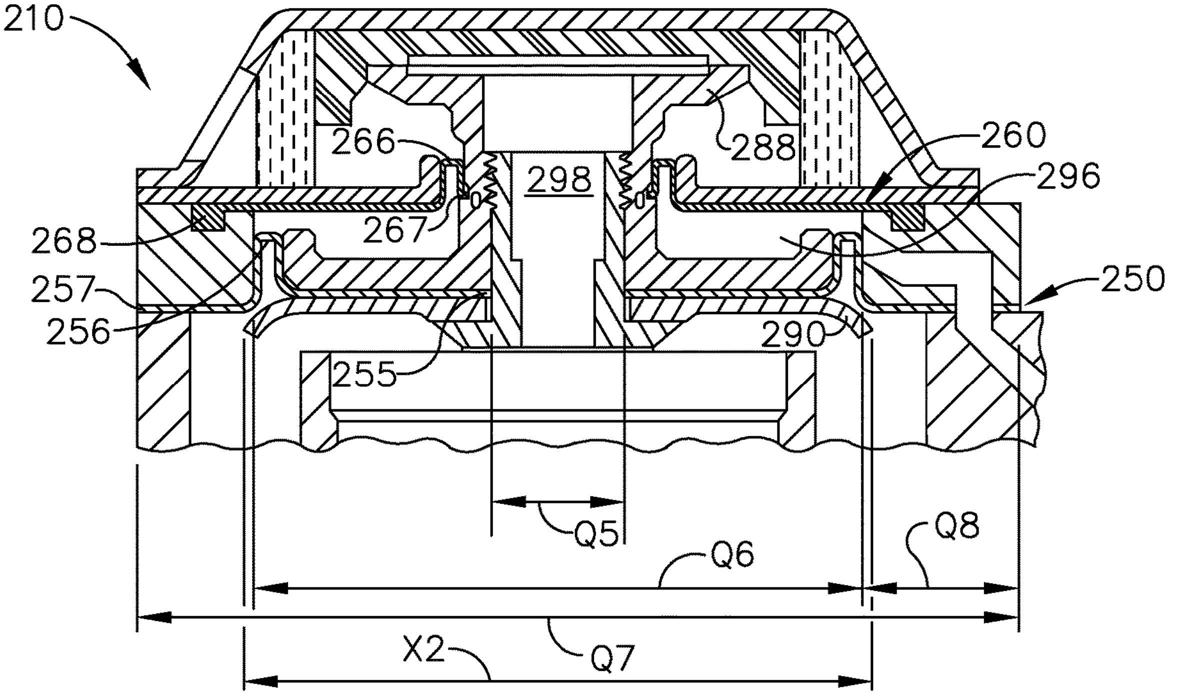
FIG. 17D (Prior Art)
FIG. 17D is a side cutaway view of the firing valve, with diaphragm seals, of a pneumatic fastener driving tool known in the prior art as a Senco Model SKS, showing the valve in its fired position.
Figure 17E:
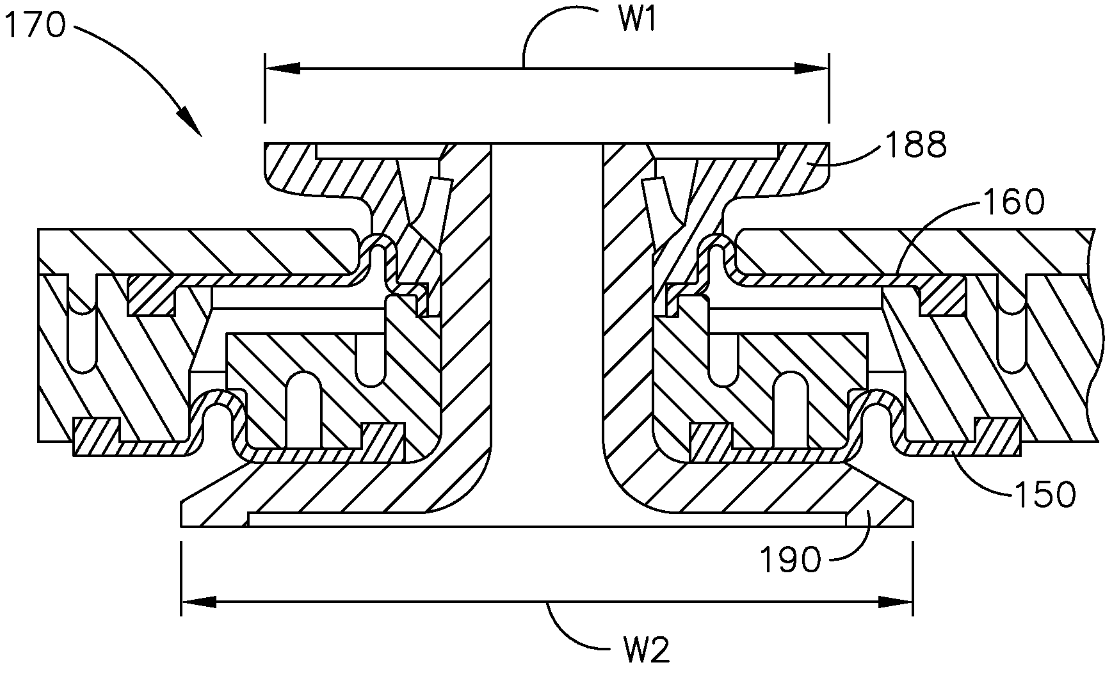
FIG. 17E (Prior Art)
FIG. 17E is a side cutaway view of the firing valve of a pneumatic fastener driving tool known in the prior art as a Senco Model SLS, showing the valve in its idle position.

Referring now to FIG. 17E, a firing valve subassembly 170 is depicted from a Senco Model SLS pneumatic stapler. A dimension W1 depicts the outer diameter of an upper annular flange 188, which is about 26.38 mm. A dimension W2 depicts the outer diameter of a lower annular flange 190, which is about 34.28 mm. The respective positions of the upper diaphragm 160 of FIG. 17A and the lower diaphragm 150 of FIG. 17B are illustrated in FIG. 17E, showing the idle state.

Referring now to FIG. 17C, a prior art pneumatic fastener tool, generally designated by the reference numeral 210, is depicted. This view illustrates the firing valve subassembly from an early model Senco pneumatic fastener tool, in an idle position, taken from FIG. 3 of U.S. Pat. No. 4,747,338. The tool 210 has a hollow stem portion 298 and a firing valve air chamber 296 surrounding the central bore. An upper diaphragm 260 and a lower diaphragm 250 both seal pressurized gas inside the firing valve air chamber 296. The upper diaphragm 260 exhibits an outer bead 268, a convolute 266, and an inner edge 267. The lower diaphragm 250 exhibits an outer edge 257, a convolute 256, and an inner edge 255.

A dimension Q1 depicts the diameter of the inner edge 267, which is about 25 mm. A dimension Q2 illustrates the diameter of the outer edge of the convolute 266, which is about 35 mm. A dimension Q3 depicts the diameter of the upper diaphragm 260, which is about 94 mm. A dimension Q4 illustrates the distance between the outer bead 268 and the outer edge of the convolute 266 along the radius. A dimension X1 illustrates the diameter of an upper annular flange 288, which is about 50 mm (These dimensions are taken from the patent drawing.)

Referring now to FIG. 17D, the prior art pneumatic fastener tool 210 is again depicted. This view illustrates the firing valve subassembly from an early model Senco pneumatic fastener tool, in a driven position, taken from FIG. 4 of U.S. Pat. No. 4,747,338. A dimension Q5 depicts the inner diameter of the inner edge 255, which is about 17 mm. A dimension Q6 depicts the diameter of the outer edge of the convolute 256, which is about 77 mm. A dimension Q7 depicts the lower diaphragm's diameter, which is about 103 mm. A dimension Q8 illustrates the distance between the outer edge 257 and the outer edge of the convolute 256, along the radius. A dimension X2 illustrates the diameter of a lower annular flange 290, which is about 81 mm (These dimensions are taken from the patent drawing.) It should be noted that the "early model Senco tool" depicted in U.S. Pat. No. 4,747,338 is much larger in actual size than the later model tool, i.e., the Senco Model SLS, depicted in FIGS. 17A, 17B, and 17E.

Figure 18B:
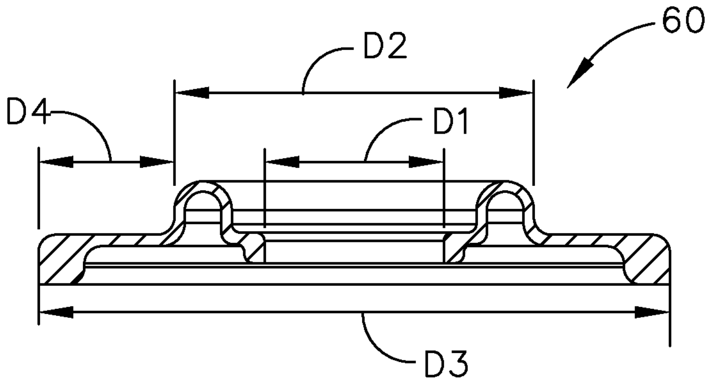
FIG. 18B is a side cutaway view of the upper diaphragm of the tool of FIG. 1, depicting dimensions of the diaphragm, including its beads and convolute.
Figure 18A:
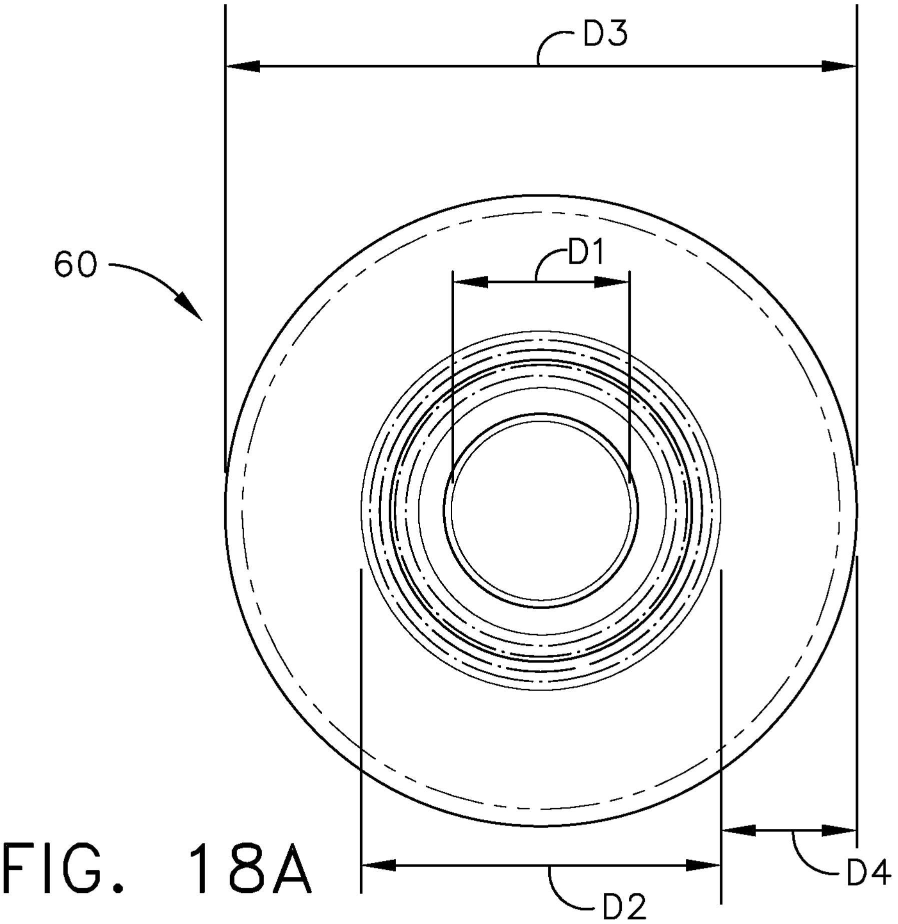
FIG. 18A is a top view of the upper diaphragm of the tool of FIG. 1, depicting dimensions of the diaphragm, including its beads and convolute.

Referring now to FIGS. 18A and 18B, the upper diaphragm 60 of the micropinner 10 is depicted. A dimension D1 illustrates the inner diameter at the inner bead 67, which is preferably about 7.92 mm. A dimension D2 illustrates the diameter of the outer edge of the convolute 66, which is preferably about 15.9 mm. A dimension D3 illustrates the outer diameter of the upper diaphragm 60, which is preferably about 27.8 mm. A dimension D4 depicts a distance between the outer edge of the outer bead 68 and the outer edge of the convolute 66, along the radius of the upper diaphragm 60.

Figure 19B:
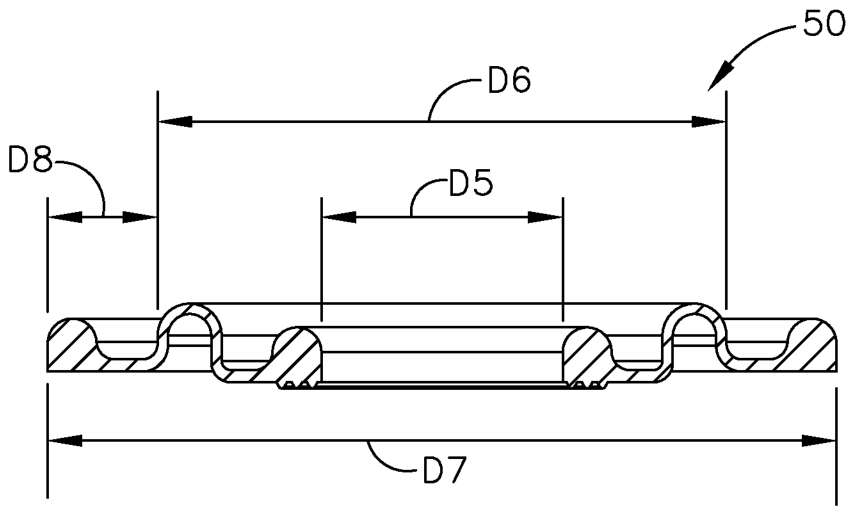
FIG. 19B is a side cutaway view of the lower diaphragm of the tool of FIG. 1, depicting dimensions of the diaphragm, including its beads and convolute.
Figure 19A:
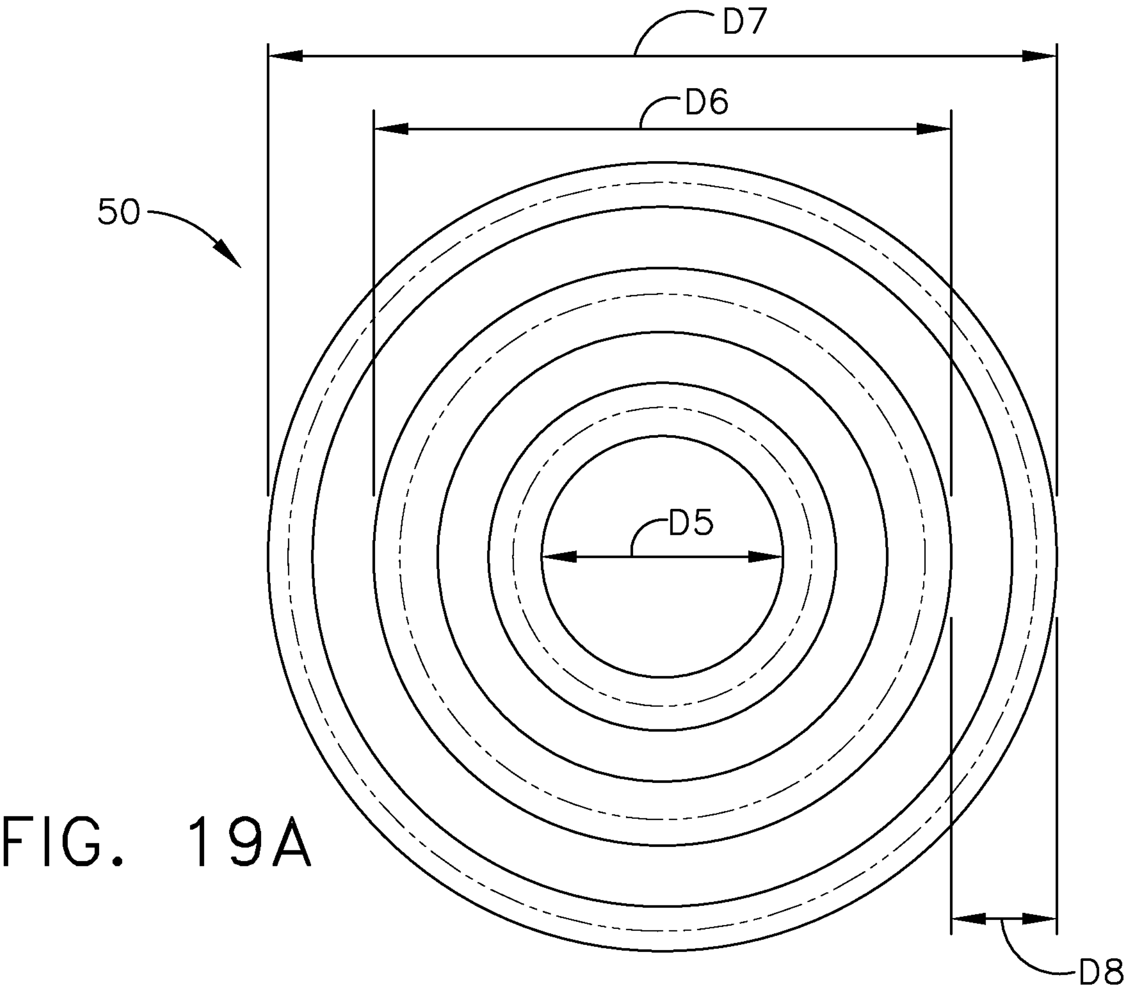
FIG. 19A is a top view of the lower diaphragm of the tool of FIG. 1, depicting dimensions of the diaphragm, including its beads and convolute.

Referring now to FIGS. 19A and 19B, the lower diaphragm 50 of the micropinner 10 is depicted. A dimension D5 illustrates the inner diameter at the inner bead 55, which is preferably about 10.31 mm. A dimension D6 illustrates the diameter of the outer edge of the convolute 56, which is preferably about 23.83 mm. A dimension D7 illustrates the outer diameter of the lower diaphragm 50, which is preferably about 32.69 mm. A dimension D8 depicts the distance between the outer edge of the outer bead 57 and the outer edge of the convolute 56, along the radios of the lower diaphragm 50.

Tool Dimensions

For ease of discussion, a table is depicted below illustrating the various dimensions described in FIGS. 8, 9, and 17A-E, 18, and 19.

| Firing Valve Subassembly 110 | Senco SLS (170) | U.S. Patent No. 4,747,338 (210) |
|---|---|---|
| UPPER ANNULAR DIAPHRAGM | | |
| D1: 7.92 mm | P1: 11.3 mm | Q1: 25 mm |
| D2: 15.9 mm | P2: 18.8 mm | Q2: 35 mm |
| D3: 27.8 mm | P3: 38.9 mm | Q3: 94 mm |
| LOWER ANNULAR DIAPHRAGM | | |
| D5: 10.31 mm | P5: 13.13 mm | Q5: 17 mm |
| D6: 23.83 mm | P6: 33.27 mm | Q6: 77 mm |
| D7: 32.69 mm | P7: 44.45 mm | Q7: 103 mm |
| UPPER ANNULAR FLANGE | | |
| V1: 19.71 mm | W1: 26.38 mm | X1: 50 mm |
| LOWER ANNULAR FLANGE | | |
| V2: 23.99 mm | W2: 34.28 mm | X2: 81 mm |

When comparing the diaphragms of the prior art to the ones in the present disclosure, the differences are clear. First, the outer diameter of the upper diaphragm D3 (about 27.8 mm) is smaller than the outer diameter of the prior art upper diaphragm P3 (about 38.9 mm). Second, the ratio of the diameter of the outer edge of the upper convolute D2 over the inner diameter of the upper diaphragm D1 is 2.006, which is larger when compared to both the ratio of the prior art diameter of the outer edge of the upper convolute P2 over the inner diameter of the upper diaphragm P1 (1.66), and the ratio of the prior art diameter of the outer edge of the upper convolute Q2 over the inner diameter of the upper diaphragm Q1 (1.4).

Third, the outer diameter of the lower diaphragm D7 (about 32.69 mm) is smaller than the outer diameter of the prior art lower diaphragm P7 (about 44.45 mm). Fourth, the ratio of the diameter of the outer edge of the lower convolute D6 over the inner diameter of the lower diaphragm D5 is 2.31, which is smaller when compared to both the ratio of the prior art diameter of the outer edge of the lower convolute P6 over the inner diameter of the lower diaphragm P5 (2.53), and the ratio of the prior art diameter of the outer edge of the lower convolute Q6 over the inner diameter of the lower diaphragm Q5 (4.53).

These ratios show that the diaphragms of the present embodiment are smaller than those of the prior art, but are still necessarily tough and durable even in view of their decreased size while undergoing the same stress and pressure of use in a similar pneumatic fastener driving tool. It is also an improvement to use smaller valve flanges in combination with these smaller diaphragms, even though the present embodiment is utilizing the same magnitude of pressurized gas used in the prior tools (about 85-100 psi).

Note that the smaller size of the tool necessitated smaller parts. Yet these parts had to be designed and manufactured to withstand the rigors of industrial use. This design and durability was accomplished without the use of exotic materials, such as titanium.

Figure 20:
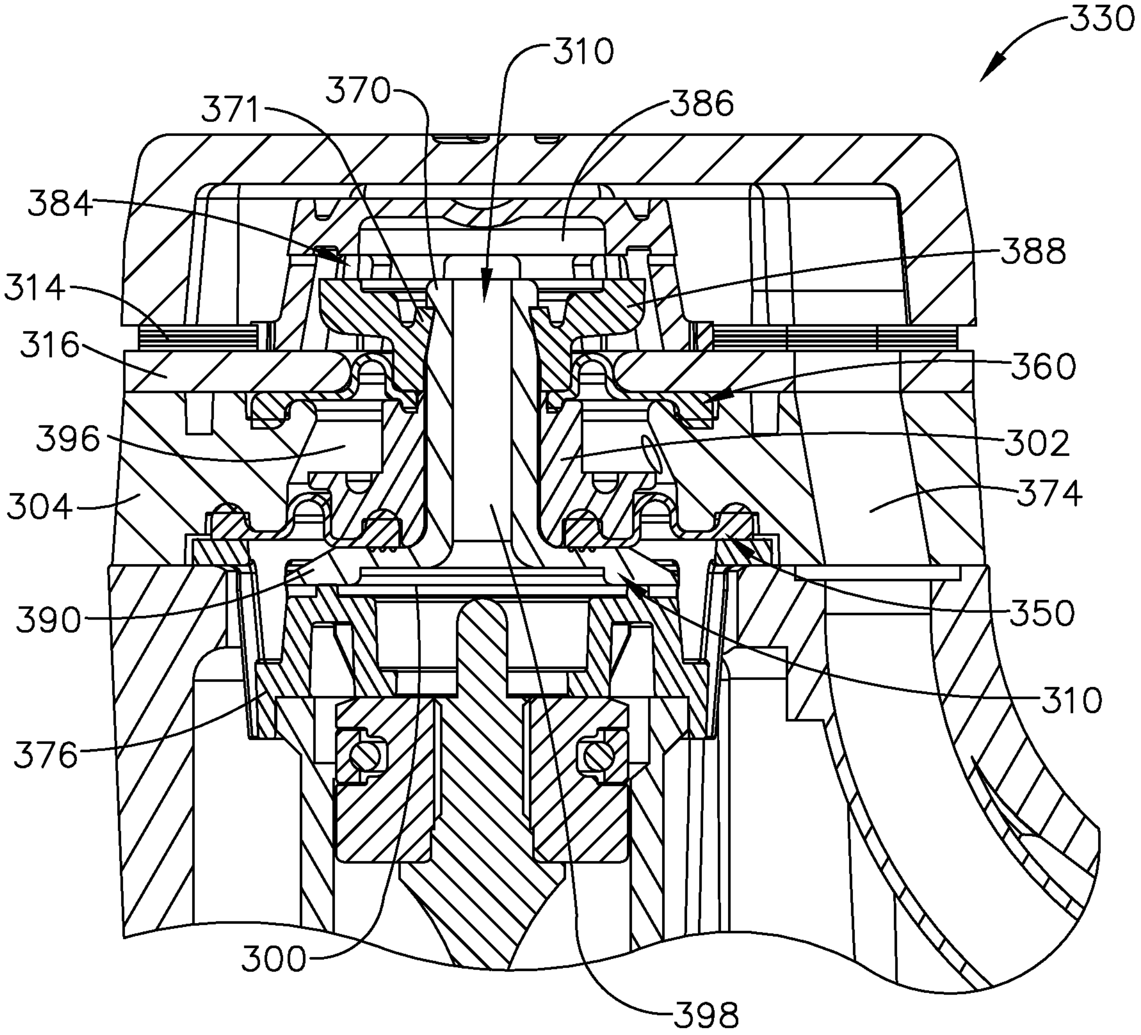
FIG. 20 is a side cutaway of a first alternative embodiment of the tool of FIG. 1, illustrating an idle position.

Referring now to FIG. 20, a first alternative embodiment is depicted illustrating a main valve subassembly (S/A) 330 in a cutaway view. A lower diaphragm seal 350 is illustrated mounted above a flow diverter portion (or lower annular flange) 390 of a firing valve subassembly (S/A) 310. Below the flow diverter portion 390 is a sleeve retainer 376. At the distal end of the main valve S/A 330 is an exhaust seal 386, an exhaust port 384, and a reciprocating exhaust valve portion (or upper annular flange) 388. The exhaust valve portion 388 is sealed by an upper diaphragm 360.

The two diaphragms 350 and 360 are retained in place by a retainer portion 302, a valve body side portion 304, and a plate retainer 316. Proximal to the plate retainer 316 is a gasket 314. Between the two rolling diaphragm seals is a firing valve air chamber 396. The firing valve air chamber 396 includes a center post (or stem) 370 having recesses for receiving deflectable clips 371, with an inner hollow stem portion 398 that is connected (via the retainer clips 371) to the exhaust valve portion 388 at one (proximal) end, and a valve seat 300 at the opposite (distal) end. The hollow stem portion 398 exhibits a longitudinal axis, and is enclosed by the center post 370, which is part of the same movable structure as the bottom flange (or flow diverter portion) 390. A gas flow port 374 is shown to the right side (in this view) of the firing valve air chamber 396. In this embodiment 330, the hollow stem 398 maintains a constant inner diameter from the lower flange 390 up to the exhaust seal 386.

Operation

The operation of the first embodiment of the tool is discussed next. First, a human user attaches a gas supply line to the gas supply port 22. Supply gas flows through the first gas flow passageway 45, through the firing valve air chamber port 75, and fills the firing valve air chamber 96. Concurrently, this gas also fills the handle portion 24 and the upper cylinder chamber 92. At this point, the pressure between the diaphragms 50 and 60 is equal to the pressure below the outermost lip of the flow diverter 90 (the lower flange). The flow diverter 90 seats on the sleeve retainer 76, effectively sealing off the upper cylinder chamber 92. It should be noted that the piston 46 is at the top of the cylinder outer wall 78 (at the ready or idle position).

The user pulls the trigger 38, forcing the remote valve stem 44 to unseal the remote trigger valve 43, thereby allowing some gas between the diaphragms 50 and 60 (inside the firing valve air chamber 96) to vent through the gas flow passageway 45 and out of the stem 44 to atmosphere. Now the pressure between the diaphragms 50 and 60 is less than the pressure below the outermost lip of the flow diverter 90. The flow diverter 90 rises off the sleeve retainer 76 (through the "rolling" movement of the convolutes 56 and 66 of the diaphragms 50 and 60), which unseals the top of the piston 46, thereby allowing the piston 46 to be pushed down by the pressurized gas (toward the driven or fired position) due to the change in pressure between the diaphragms 50 and 60. The gap between the exhaust valve portion 88 and the exhaust seal 86 has now closed, effectively sealing off the ability to vent gas out of the exhaust port 84. Once the piston 46 has passed a set of gas check valve holes 94 in the outer cylinder wall 78, gas can escape into a lower cylinder chamber 93. When the trigger 38 is released and the firing valve subassembly 110 resets, the working cylinder 30 is resealed at the top. Then gas rushes back into the working cylinder 80 via a plurality of return air holes 95. This "rush" of gas forces the piston 46 and driver blade 42 back to a ready position. The gas then flows through the hollow stem portion 98, through the exhaust valve portion 88 and the exhaust port 84, then through the second gas passageway 82, and finally exits out of the rear of the handle into atmosphere.

It should be noted that the upper annular flange 88, the upper diaphragm 60, the upper inner bead 67, and the upper outer bead 68 may also be referred to herein, respectively, as a first annular flange 88, a first annular diaphragm 60, a first inner bead 67, and a first outer bead 68. Note also, that the lower annular flange 90, the lower diaphragm 50, the lower inner bead 55, and the lower outer bead 57 may also be referred to herein, respectively, as a second annular flange 90, a second annular diaphragm 50, a second inner bead 55, and a second outer bead 57.

Note further, that the upper annular flange 88 is sometimes referred to as being at, or proximal to, a first end (of the firing valve subassembly), and that the lower annular flange 90 is sometimes referred to as being at, or proximal to, a second end (of the firing valve subassembly).

Second Embodiment

Figure 21:
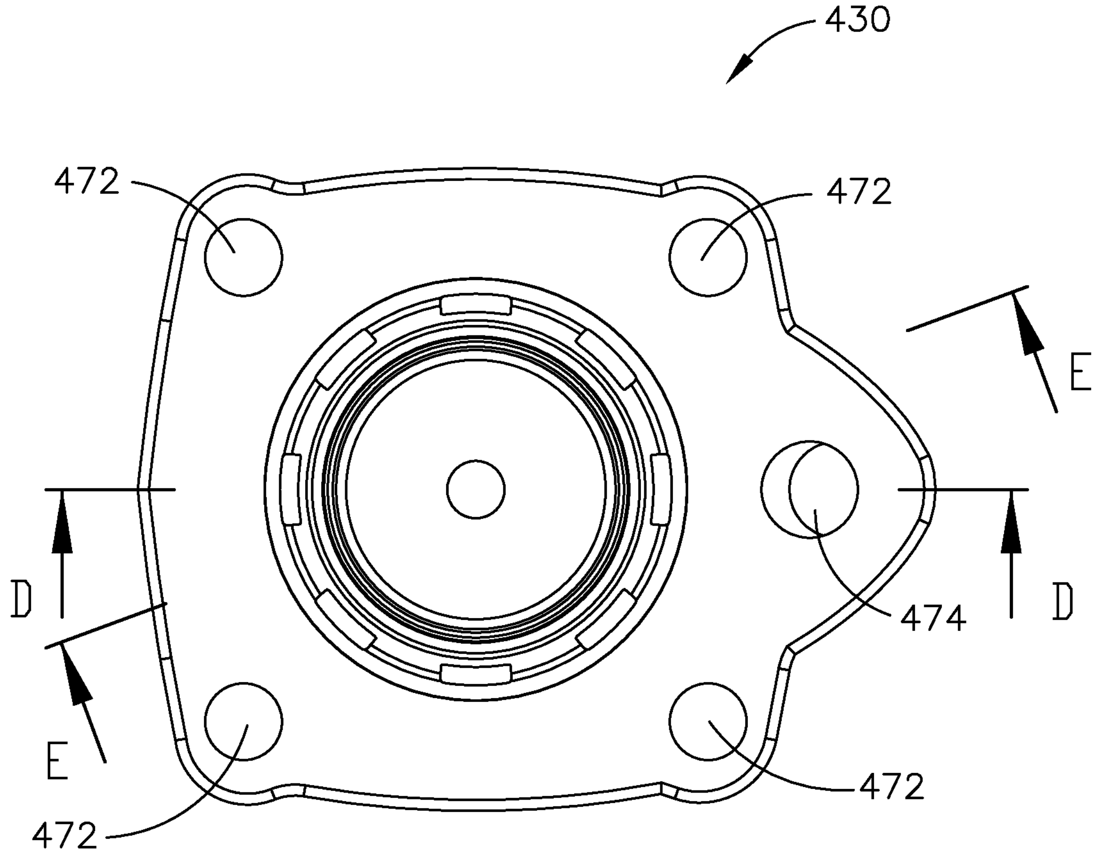
FIG. 21 is a bottom view of a second alternative embodiment of the main valve subassembly of the tool of FIG. 1.

Referring now to FIG. 21, a top view of another alternative embodiment of a main valve subassembly 430 is depicted. The main valve subassembly 430 has a gas flow port 474, and a plurality of bolt holes 472. Fasteners extending through the bolt holes 472 are used to secure the main valve subassembly 430 to the tool 10.

Figure 22:
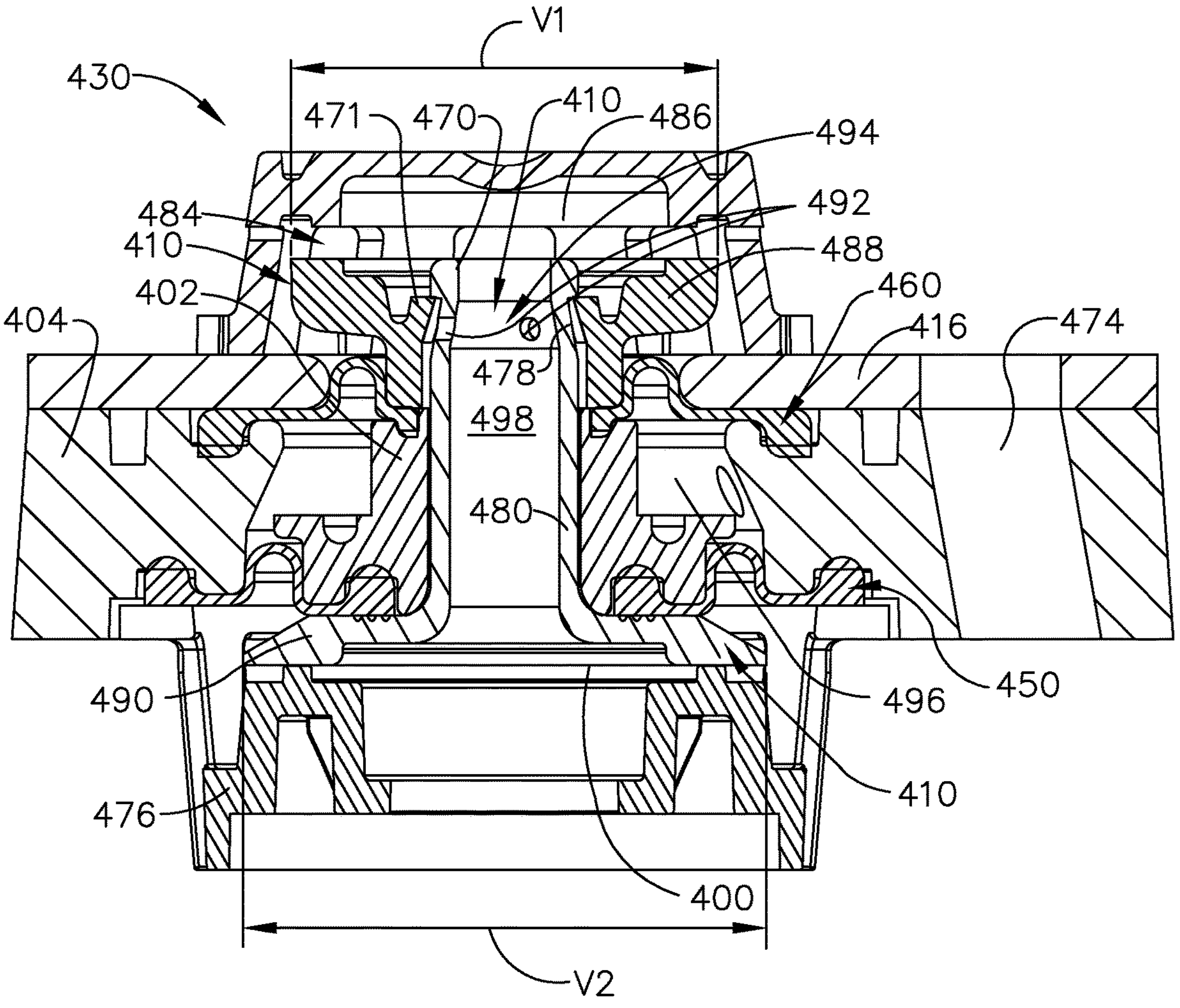
FIG. 22 is a side cutaway view along the line D-D of FIG. 21 of the second alternative embodiment of the main valve subassembly.

Referring now to FIG. 22, the second alternative embodiment of FIG. 21 is depicted illustrating a main valve subassembly (S/A) 430 in a cutaway view taken along the line D-D of FIG. 21. A lower diaphragm seal 450 is illustrated mounted above a flow diverter portion (or lower annular flange) 490 of a firing valve subassembly (S/A) 410. Below the flow diverter portion 490 is a sleeve retainer 476. At the distal end of the main valve S/A 430 is an exhaust seal 486, an exhaust port 484, and a reciprocating exhaust valve portion (or upper annular flange) 488. The exhaust valve portion 488 is sealed by an upper diaphragm 460.

The two diaphragms 450 and 460 are retained in place by a retainer portion 402, a valve body side portion 404, and a plate retainer 416. Between the two rolling diaphragm seals is a firing valve air chamber 496. The firing valve air chamber 496 includes a center post (or stem) 470 having recesses at a neck portion (where the lead line points for reference numeral 470) for receiving deflectable clips 471, with an inner hollow stem portion 498 that is connected (via the retainer clips 471) to the exhaust valve portion 488 at one (proximal) end, and a valve seat 400 at the opposite (distal) end.

The hollow stem portion 498 exhibits a longitudinal axis, and is enclosed by the center post 470, which is part of the same movable structure as the bottom flange (or flow diverter portion) 490. A gas flow port 474 is shown to the right side (in this view) of the firing valve air chamber 496. It will be understood that the neck portion at 470 is sized and shaped to receive the retainer clips 471, once the upper annular flange 488 is attached to the main center post (i.e., the stem 470), via those retainer clips 471.

It should be noted that the diameter V1 of the upper flange is the same in this embodiment 430 as in the other embodiments, and that the diameter V2 of the lower flange is the same in this embodiment as in the other embodiments.

In this second alternative embodiment 430, the center post (or stem) 470 includes a nominally cylindrical wall that is of a uniform thickness from the lower annular flange 490 to a tapered portion 478, to provide extra strength of material during operation of the main valve S/A 430. In the embodiment of FIG. 20, the center post 370 wall maintains a constant inner diameter. However, in this embodiment of FIGS. 22-23, the center post 470 tapers inward also along its interior circumference. This is illustrated as a tapered stem portion 494. The retainer clips 471 seat against the tapered wall portion 478.

Note that the wall thickness of the stem/post 470 is designed to remain at a constant outer diameter at both the tapered wall portion 478 (neck portion) and the non-tapered wall portion 480—see FIG. 22. This feature allows for reducing the overall size of the gas valve 430, while maintaining its mechanical integrity.

As a result of this tapered stem portion 494, the exhaust gas that must evacuate during the tool's operation through the hollow stem portion 498 is now slightly bottlenecked by this tapered design. Thus, a plurality of center post exhaust ports 492 (through-holes) have been provided at the tapered stem portion 494 to assist with evacuating this exhaust gas.

Figure 23:
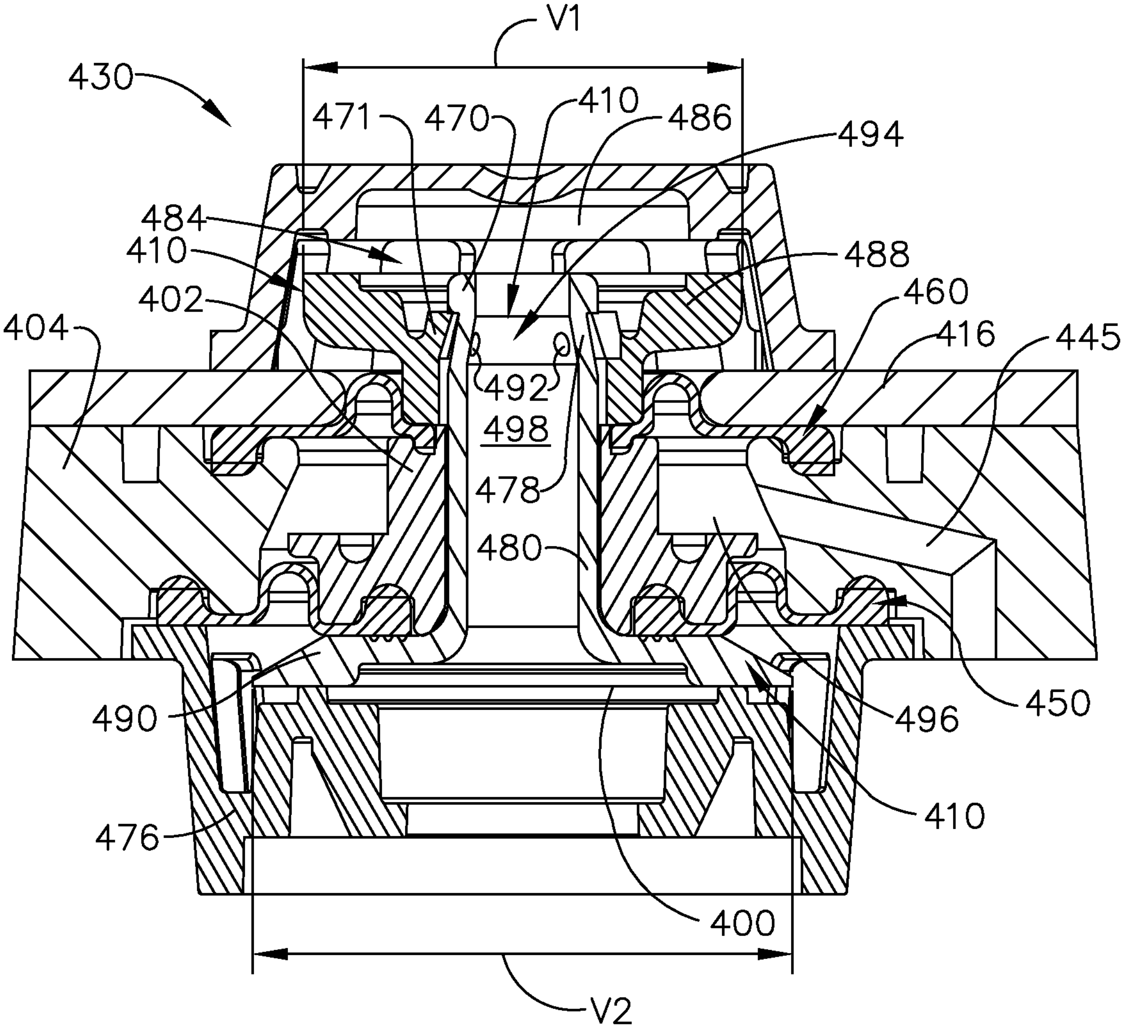
FIG. 23 is a side cutaway view along the line E-E of FIG. 21 of the second alternative embodiment of the main valve subassembly.

Referring now to FIG. 23, the second alternative embodiment of the main valve S/A 430 is depicted in cross-section along the line E-E of FIG. 21. This view better shows some of the center post exhaust ports 492. Note that a first gas flow passageway 445 is depicted. A discussion of the exhaust gas flow pattern now follows.

Figure 24:
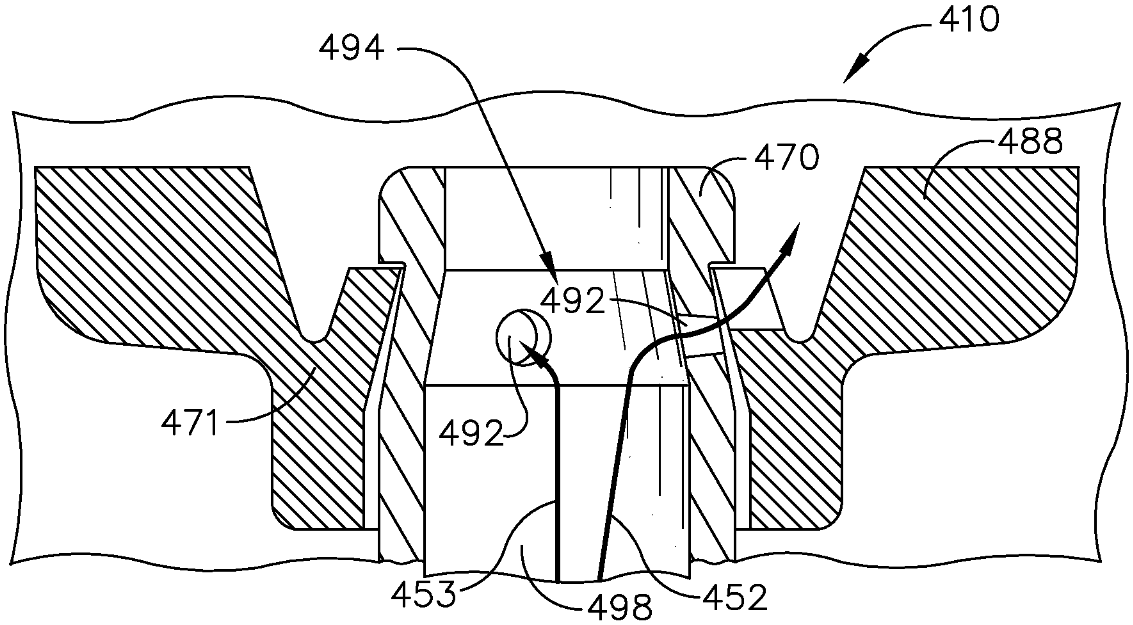
FIG. 24 is a side cutaway view of a portion of the firing valve subassembly of the second alternative embodiment of the main valve subassembly.
Figure 25:
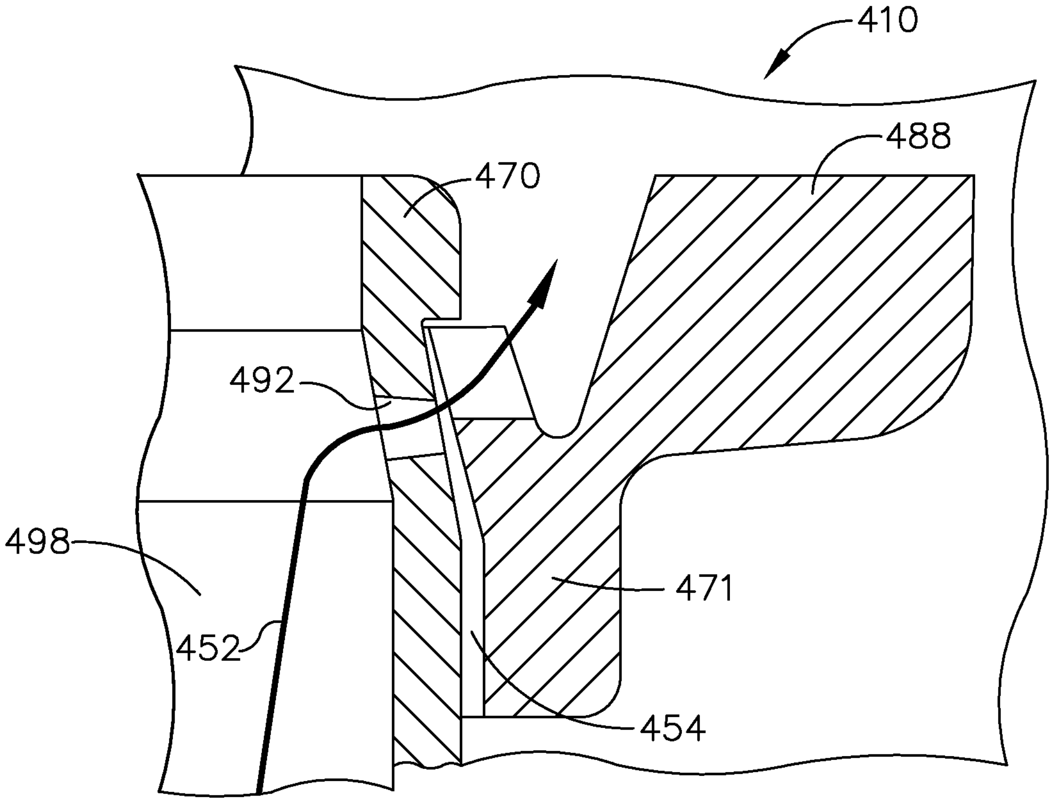
FIG. 25 is a partial side cutaway view of a portion of the firing valve subassembly of the second alternative embodiment of the main valve subassembly.
Figure 26:
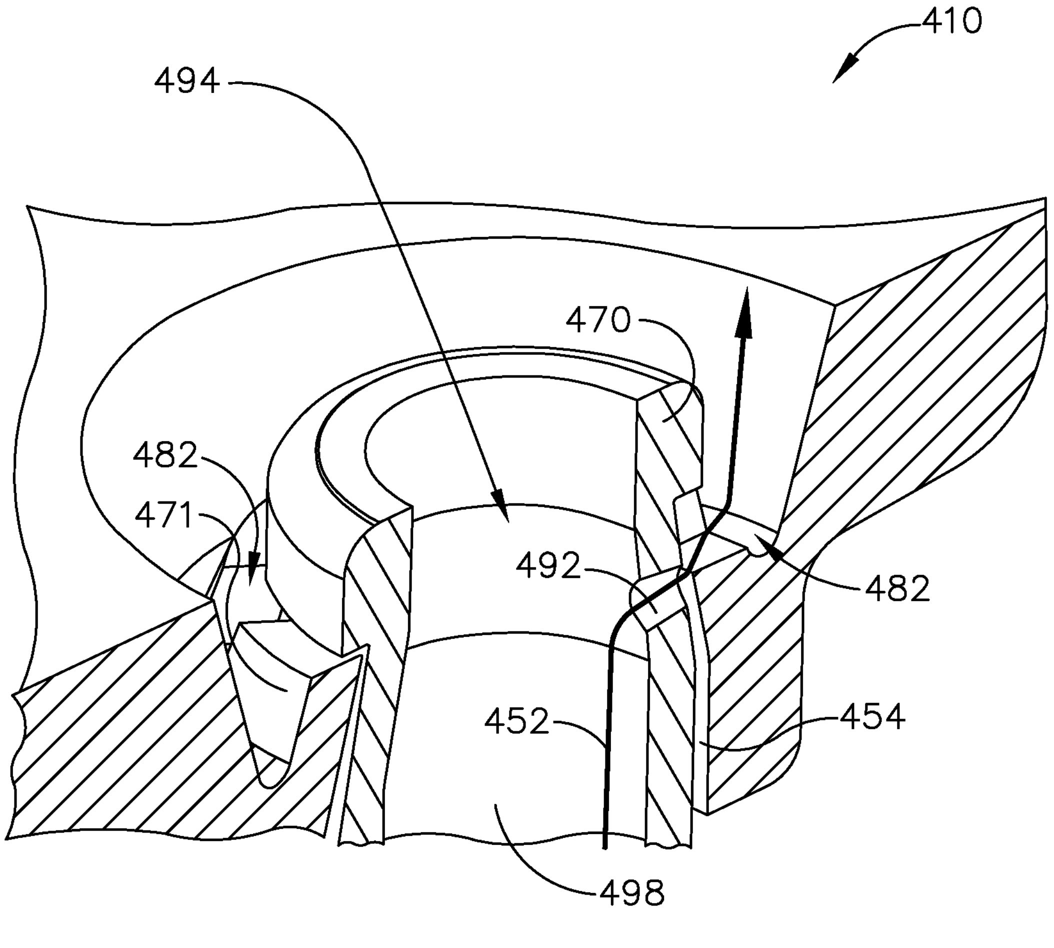
FIG. 26 is a top cutaway perspective view of a portion of the firing valve subassembly of the second alternative embodiment of the main valve subassembly.

Referring now to FIG. 24, air flow lines 452 and 453 are illustrated showing potential paths of exhaust gas. Note that the majority of the exhaust gas flows through the hollow stem portion 498. However, some of the gas flows through the plurality of center post exhaust ports 492, as depicted in FIGS. 24-26. The air flow line 452 depicts exhaust gas flowing through the hollow stem portion 498, diverting through one of the center post exhaust ports 492, and exiting out between the clips retainer 471 on the upper annular flange. The air flow line 453 depicts exhaust gas travelling in the same manner, but due to the presence of the hollow stem portion 498, the air flow through the clips 471 is not visible in this view.

Referring now to FIG. 25, a closer view of the right portion of FIG. 24 is shown for better clarity. The air flow line 452 depicts exhaust gas flowing through the hollow stem portion 498 and exiting through a center post exhaust port 492. The exhaust gas then flows between the clips 471. Note that in this closer view, a small gap 454 between the center post 470 and the retainer clips 471 can be seen. A small portion of exhaust gas flows through this small gap 454 before exiting between the clips 471. It should be noted that this gap 454 is sealed off by the upper diaphragm 460, and any exhaust gas that flows through this gap 454 will still exhaust with the majority of the exhaust gas that flows through the hollow stem portion 498.

Referring now to FIG. 26, the openings 482 between the retainer clips 471 are visible. As above, the air flow line 452 depicts exhaust gas flowing through the hollow stem portion 498, and then flowing through a center post exhaust port 492. Then the exhaust gas flows between the gap 454 and the clips 471.

Note that some of the embodiments illustrated herein do not have all of their components included on some of the figures herein, for purposes of clarity. To see examples of such outer housings and other components, especially for earlier designs, the reader is directed to other U.S. patents and applications owned by Senco. Similarly, information about "how" the electronic controller operates to control the functions of the tool is found in other U.S. patents and applications owned by Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, and 8,763,874; also published U.S. patent application No. 2016/0288305 and published U.S. patent application, No. 2018/0178361. These documents are incorporated by reference herein, in their entirety.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A firing valve subassembly for a pneumatic micro-fastener driving tool, said firing valve subassembly comprising:

a first annular flange, a first annular diaphragm, a second annular diaphragm, a second annular flange exhibiting a hollow stem, and a retainer portion positioned between said first annular flange and said second annular flange;

said hollow stem exhibiting a longitudinal axis, said first and second annular flanges being spaced-apart along said longitudinal axis, said retainer portion holding said first annular diaphragm against said first annular flange, and said retainer portion holding said second annular diaphragm against said second annular flange;

wherein: said first annular flange exhibits an outer diameter smaller than 26 mm, and said second annular flange exhibits an outer diameter smaller than 34 mm.

2. The firing valve subassembly of claim 1, wherein:

said first annular diaphragm exhibits an outer diameter of 28 mm and an inner diameter of 8 mm;

said second annular diaphragm exhibits an outer diameter of 33 mm and an inner diameter of 10.5 mm;

said first annular diaphragm comprises a first inner bead proximal to said first annular diaphragm inner diameter, a first outer bead proximal to said first annular diaphragm outer diameter, and a first convolute between said first annular diaphragm inner diameter and said first annular diaphragm outer diameter; and said second annular diaphragm comprises a second inner bead proximal to said second annular diaphragm inner diameter, a second outer bead proximal to said second annular diaphragm outer diameter, and a second convolute between said second annular diaphragm inner diameter and said second annular diaphragm outer diameter.

3. The firing valve subassembly of claim 2, wherein:

the ratio of said first annular diaphragm first convolute diameter over said first annular diaphragm inner bead diameter is approximately 2.006, and the ratio of said second annular diaphragm second convolute diameter over said second annular diaphragm inner bead diameter is approximately 2.31.

4. The firing valve subassembly of claim 1, further comprising:

a valve body, said valve body including a sleeve retainer;

a retainer plate;

a working cylinder, said cylinder including a movable piston; and a driver secured to said movable piston;

wherein:

said firing valve subassembly exhibits a first end proximal to said first annular flange, and a second end proximal to said second annular flange; and if said tool is actuated, said firing valve subassembly moves toward said first end.

5. The firing valve subassembly and working cylinder of claim 4, further comprising:

a first cylinder chamber that temporarily stores pressurized gas;

wherein:

if said tool is actuated, pressurized gas from said first cylinder chamber moves past said second annular flange into said working cylinder, for a drive stroke.

6. The firing valve subassembly and working cylinder of claim 4, wherein:

after a drive stroke of said tool, pressurized gas flows through said hollow stem toward said first end, past said first annular flange, and said firing valve subassembly moves towards said second end, in a return stroke.

7. The firing valve subassembly and working cylinder of claim 4, wherein:

said first annular diaphragm and said second annular diaphragm both roll proximal to a first convolute and a second convolute, respectively, when said firing valve subassembly moves toward said first end, and said first annular diaphragm and said second annular diaphragm both unroll proximal to said first convolute and said second convolute, respectively, when said firing valve subassembly moves toward said second end.

8. A firing valve subassembly for a pneumatic micro-fastener driving tool, said firing valve subassembly comprising:

a first annular flange, a first annular diaphragm, a second annular diaphragm, a second annular flange including a hollow stem, and a retainer portion positioned between said first annular flange and said second annular flange;

said hollow stem exhibiting a longitudinal axis, said first and second annular flanges being spaced-apart along and perpendicular to said longitudinal axis, said retainer portion holding said first annular diaphragm against said first annular flange, and said retainer portion holding said second annular diaphragm against said second annular flange;

wherein:

said hollow stem, proximal to said first annular flange, includes a tapered portion;

said hollow stem exhibits a constant outer diameter throughout its length along said longitudinal axis, from said second annular flange to said tapered portion;

said hollow stem includes a nominally cylindrical wall that extends from said second annular flange to said first annular flange, and includes said tapered portion; and said nominally cylindrical wall of the hollow stem exhibits a uniform thickness from said second annular flange through and including said tapered portion.

9. The firing valve subassembly of claim 8, further comprising:

a plurality of through-holes in said hollow stem at locations that are proximal to said first annular flange, wherein said plurality of through-holes allows at least a portion of the exhaust gas to evacuate therethrough.

10. The firing valve subassembly of claim 8, further comprising:

at least one retainer clip that is located proximal to said first annular flange, wherein said at least one retainer clip seats against said tapered portion of the hollow stem.

11. The firing valve subassembly of claim 10, wherein: said hollow stem includes a neck portion proximal to said first annular flange, wherein said neck portion is sized and shaped to receive and hold in place said at least one retainer clip, which thereby holds said first annular flange to said hollow stem.

* * * * *